Feb. 7, 1967  C. E. ROGERS, JR  3,302,226
HEEL ATTACHING AND HEEL SEAT POUNDING MACHINES
Filed Jan. 4, 1965  13 Sheets-Sheet 1

*Inventor*
Chester E. Rogers, Jr.
By his Attorney
Richard B. Megley

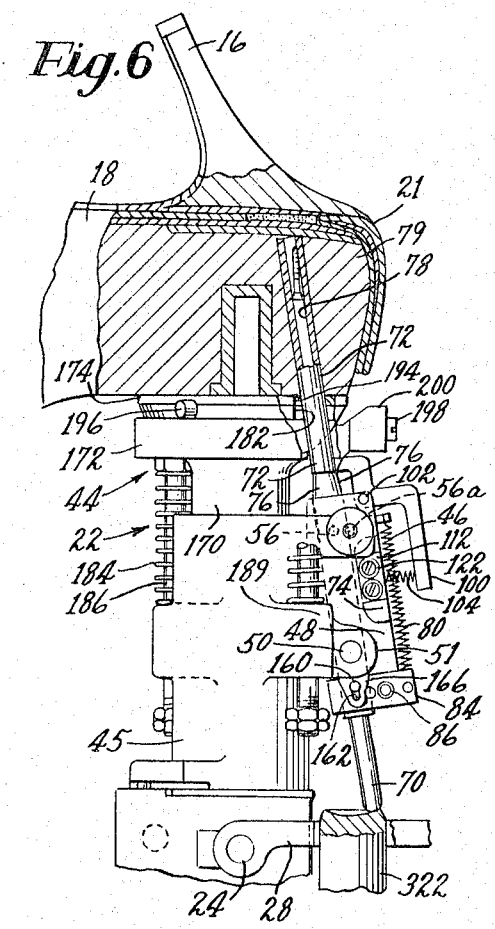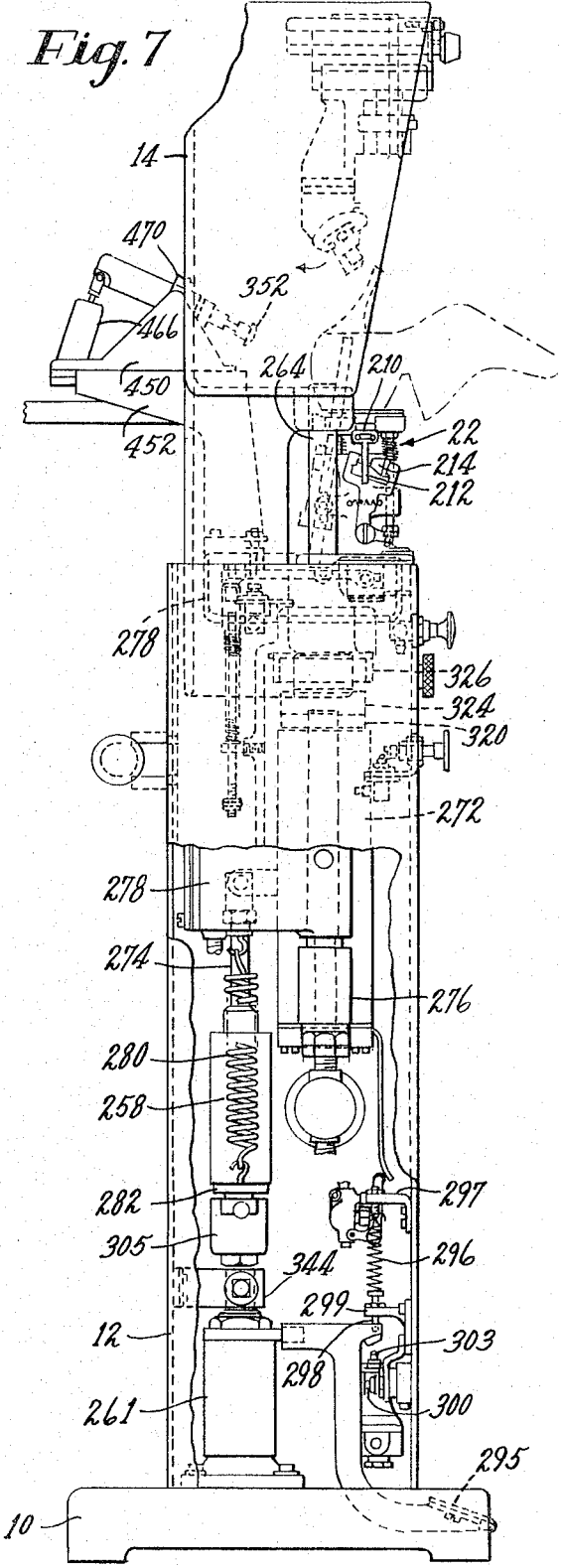

Feb. 7, 1967  C. E. ROGERS, JR  3,302,226
HEEL ATTACHING AND HEEL SEAT POUNDING MACHINES
Filed Jan. 4, 1965  13 Sheets-Sheet 5

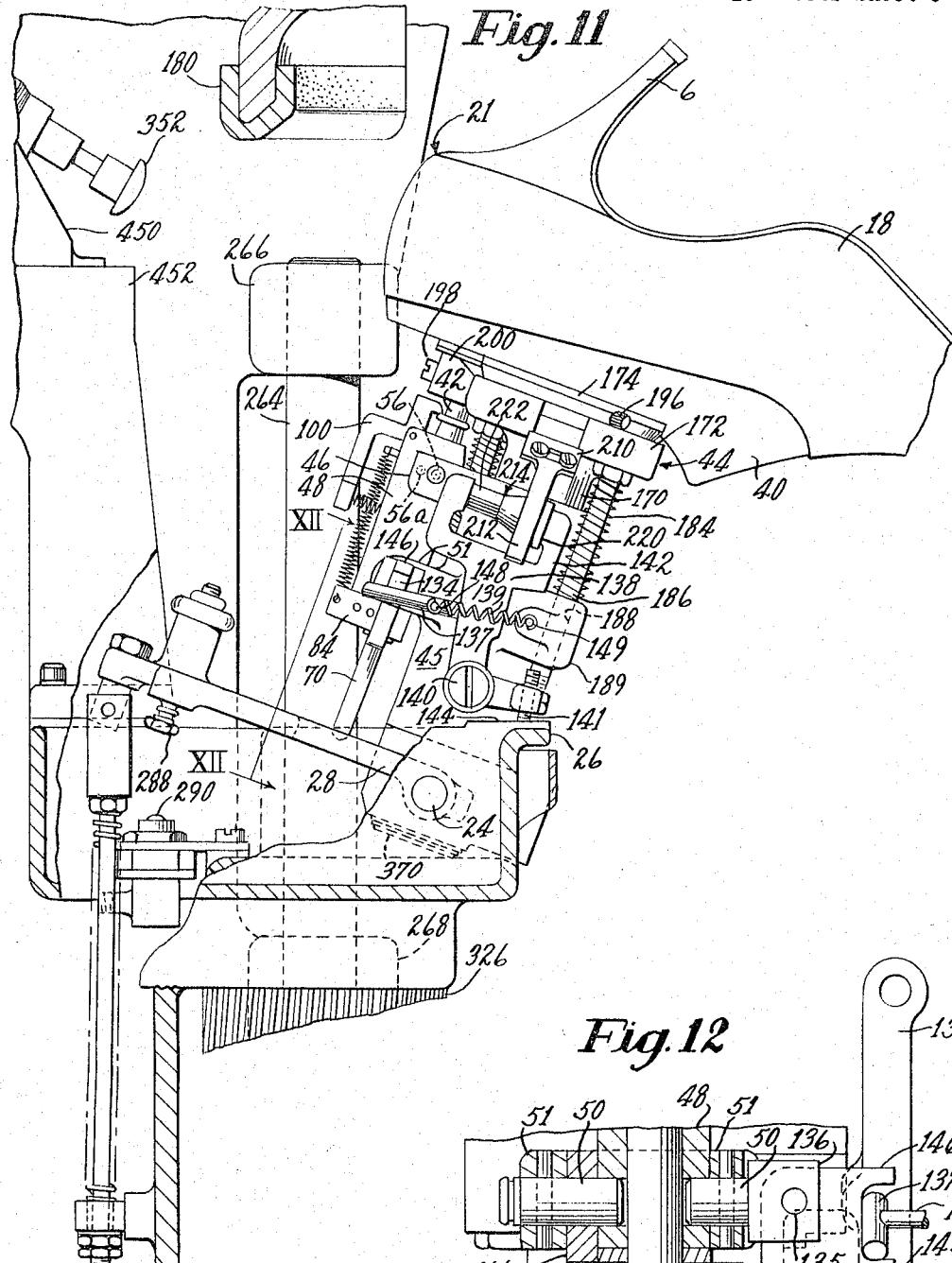
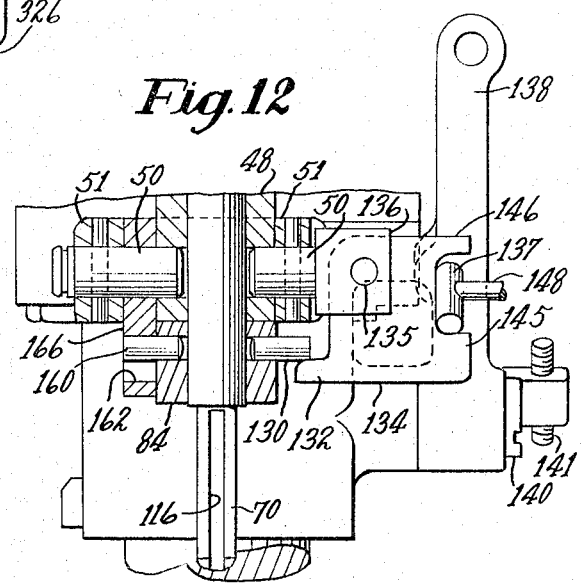

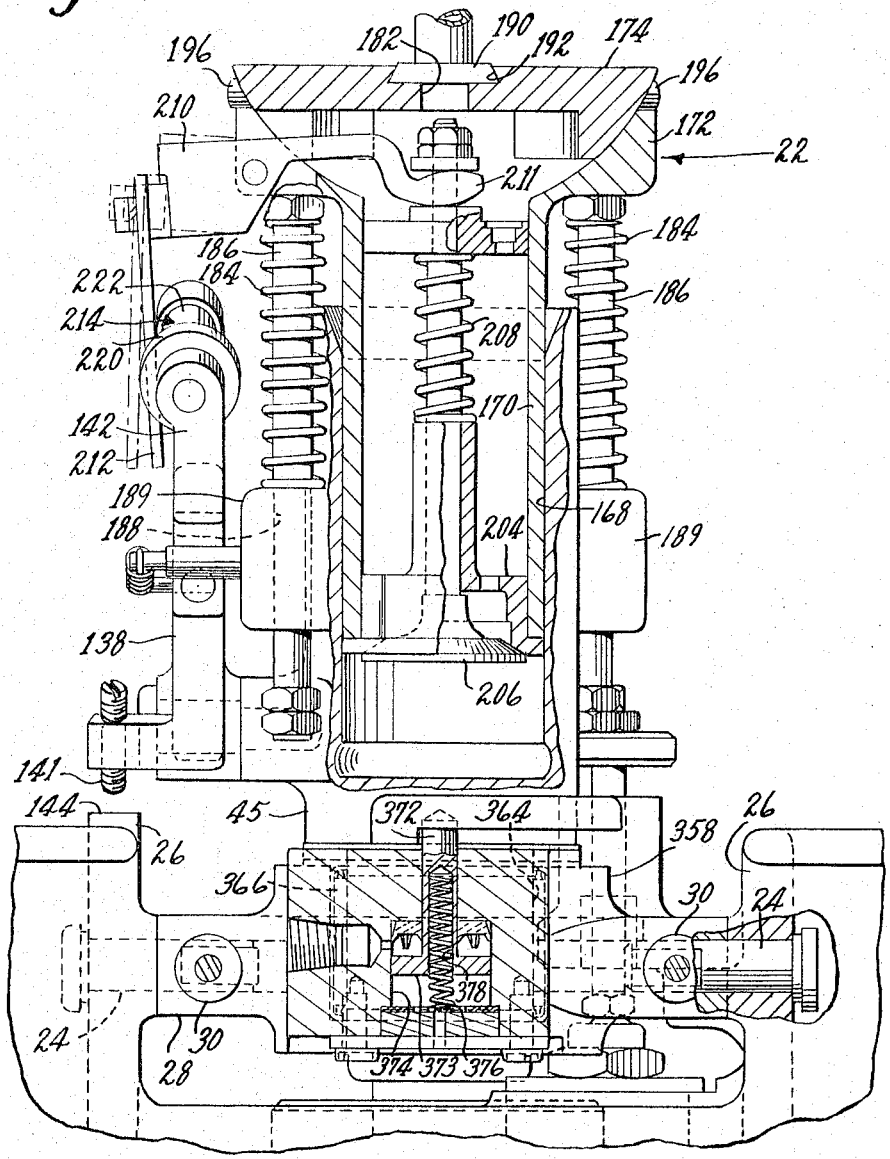

Feb. 7, 1967  C. E. ROGERS, JR  3,302,226
HEEL ATTACHING AND HEEL SEAT POUNDING MACHINES
Filed Jan. 4, 1965 13 Sheets-Sheet 8

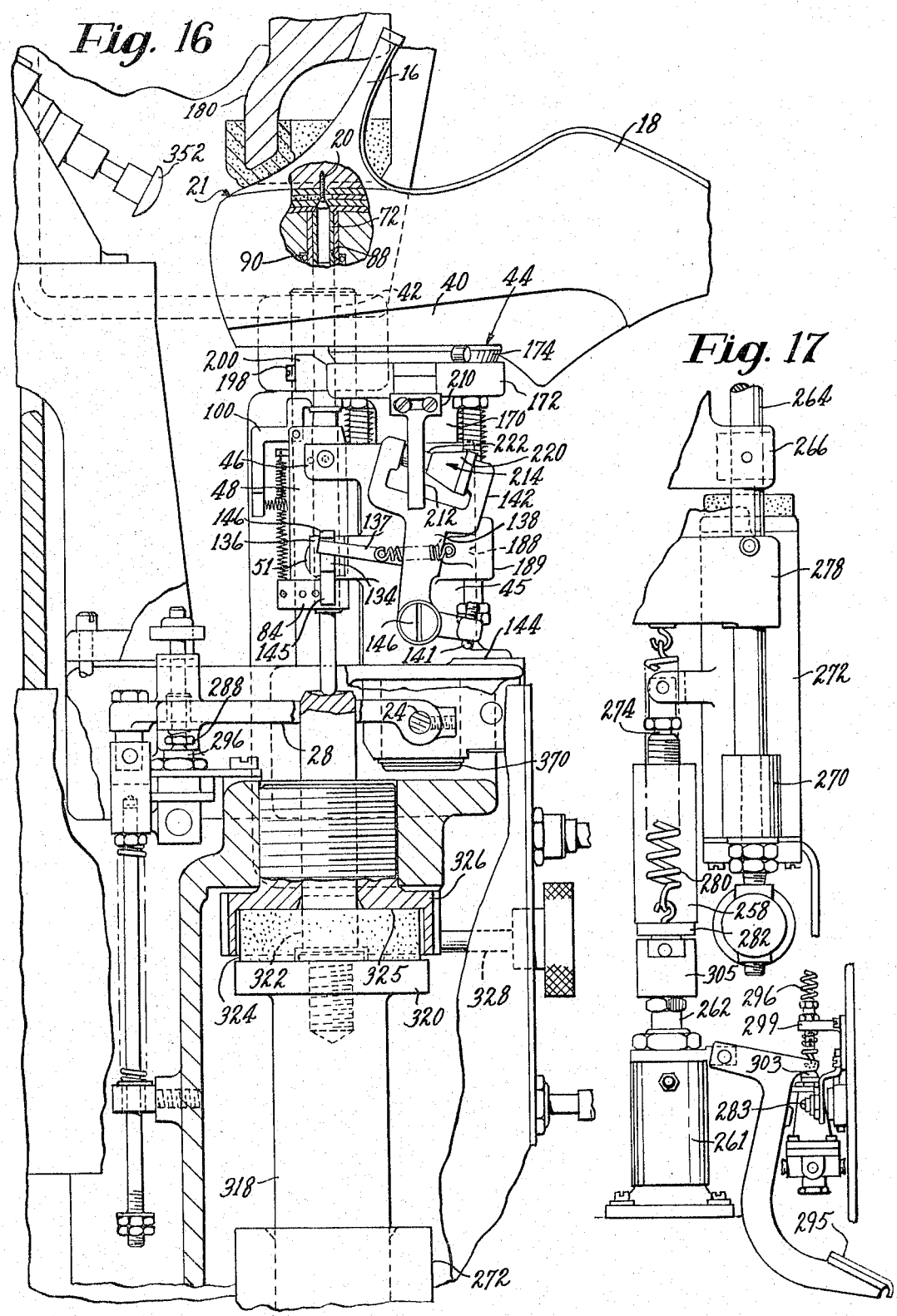

Feb. 7, 1967  C. E. ROGERS, JR  3,302,226
HEEL ATTACHING AND HEEL SEAT POUNDING MACHINES
Filed Jan. 4, 1965  13 Sheets-Sheet 11

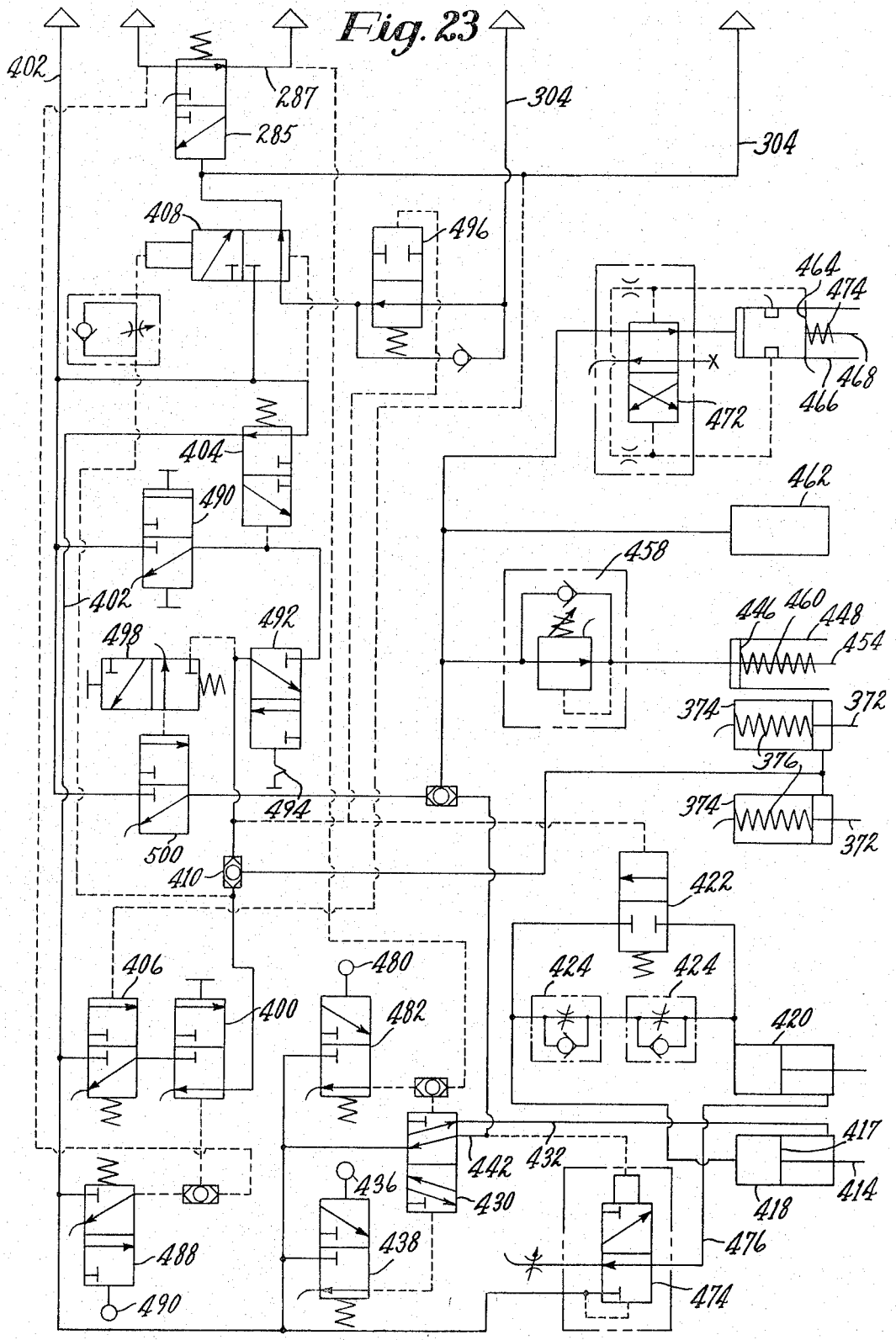

United States Patent Office 3,302,226
Patented Feb. 7, 1967

3,302,226
HEEL ATTACHING AND HEEL SEAT POUNDING MACHINES
Chester E. Rogers, Jr., Beverly, Mass., assignor to United Shoe Machinery Corporation, Boston, Mass., a corporation of New Jersey
Filed Jan. 4, 1965, Ser. No. 422,923
37 Claims. (Cl. 12—42.5)

This invention relates to machines for attaching heels to shoes and for pounding the heel seat area of a shoe, i.e., that portion of the backpart wherein the lower edge of the heel abuts the backpart to provide a smooth, attractive appearance free of bulges and inconsistencies in the heel seat area.

Heretofore, the operations of heel attaching and heel seat pounding were performed separately in the normal shoemaking cycle. The heel attaching operation was generally performed on machines of the type illustrated and described in United States Letters Patent No. 2,428,047, granted September 30, 1947, to John F. Standish. Pounding of the heel seat was most commonly performed manually. The disadvantages inherent in manual operations in any manufacturing procedure derive generally from human frailties and are well known. However, they are magnified in the shoemaking art due to the structural complex of the product and the dexterity and caution required in its manufacture. Ergo, manual heel seating pounding has encumbered the advancement of the shoemaking art throughout its drive toward automation.

A number of machines have been provided which perform the heel seat pounding operation in a semi-automatic fashion independent of the heel attaching operation. However, they have had limited usage due to a variety of mechanical short-comings. Certain of these machines have been limited to use prior to the heel attaching operation. These machines have been rejected by shoemakers as it is impossible to blend the heel seat portion with the heel unless the heel is in position on the shoe. That is, one purpose of the heel seat pounding operation, in addition to providing a smooth heel seat area, is to blend the heel seat material with the lower edge of the heel thereby to eliminate a clear demarcation between these two components. Obviously, this can only be accomplished after the heel is attached.

Heel seat pounding machines which can be employed subsequent to the heel attaching operation have been characterized by a common inability to insure alinement of the heel seat with the pounding means. That is, the pounding means must be exactly positioned to smooth the heel seat area and blend the heel seat material with the heel. Further, misalinement whereby the heel is pounded can result in destruction or damage to the heel.

Prior to the present invention there has been no commercial machine capable of performing the combined operations of heel attaching and heel seat pounding with the precision of the machine embodying the subject invention. In fact, there has been no machine accepted by shoemakers for performing these operations to applicant's knowledge. The apparent reason for this is the complexity of the automatic apparatus required to perform each of the operations per se. Until the subject invention, a machine for performing these operations has been without the scope of the learned artisans working in this field. Reference to the teachings of the above referenced patent and more particularly, to application for Letters Patent of the United States, Serial No. 242,942, filed December 7, 1962, in applicant's name, now Patent No. 3,167,781, establishes the validity of my statement in re the complexity of the required apparatus.

In order to perform heel seat pounding on a machine which includes the most advantageous features important to heel attaching taught by the referenced application, the entire assemblage employed for mounting a shoe and attaching the heel thereto must be mounted for translation relative to pounding instrumentalities. The subject invention accomplishes this end which has heretofore evaded the skilled artisans working in this field and provides further novel means which are embodied in the machine of the subject invention.

The machine embodying the features of the subject invention locates a shoe in a fixed operative position on the machine and attaches a heel thereto. The relative positioning of the heel, heel seat and attaching means are thus established during the attaching cycle. The pounding instrumentalities are mounted on the machine in fixed spacial relation to the means used to locate the shoe in proper position. When the pounding operation is performed immediately after the attaching operation with the shoe and heel in the positions established during the attaching cycle, alinement of the heel seat area with the pounding instrumentalities is assured.

Accordingly, the principal object of the present invention is to provide a machine for attaching a heel to a shoe and for pounding the heel seat of said shoe after completion of the heel attaching operation.

A further object is to provide a machine which can automatically pound the heel seat of a shoe after the attachment of a heel thereto.

A correlative object is to provide a machine which permits the operator manually to position the heel seat relative to pounding instrumentalities in order that he may conduct the pounding operation at his discretion.

A still further object of the invention is to provide a machine in which a heel is attached by initiating an automatic heel attaching cycle and in which the operator may thereafter elect to initiate an automatic heel seat pounding operation or conduct the heel seat pounding operation manually.

To this end and in accordance with a feature of this invention there is provided a combined heel attaching and heel seat pounding machine comprising a jack movable between a work receiving position and a heel attaching position, holddown means movable into and out of engagement with the heel of a shoe mounted on the jack to clamp the heel in position, means for applying attaching means to said heel, means for pounding the heel of a shoe mounted on said jack, means mounting said holddown means and means mounting said jack permitting movement thereof whereby a shoe mounted on said jack and clamped in position by said holddown means may be translated relative to said pounding means, means facilitating the selective implementation of a manual pounding cycle whereby particular portions of the heel seat of a shoe mounted on the jack may be exposed to the pounding means at the discretion of the operator of the machine or of an automatic pounding cycle whereby the entire heel seat area of a shoe mounted on the jack is exposed to said pounding means, and means for translating said jack, holddown means and a shoe clamped therebetween relative to said pounding means in the automatic pounding cycle.

The above and other features of the invention, together with various novel details of construction and combinations of parts, will now be more particularly described in connection with an illustrative machine in which the invention is embodied and with reference to the accompanying drawings thereof in which:

FIG. 6 is a view in side elevation, partly in section, of a jack having a shoe thereon mounted on a last having a spindle receiving passage disposed at an angle to the last pin receiving thimble;

FIG. 7 is a view in side elevation of the machine illustrated in FIG. 1, certain frame portions being cut away to reveal internal mechanisms;

FIG. 11 is a view in side elevation, partly in section, showing the camming means associated with the jack;

FIG. 12 is an enlarged view similar to FIG. 9 illustrating the spindle locking means in the locking position;

FIG. 13 is a sectional view taken along the line XIII—XIII of FIG. 8 with certain other parts broken away;

FIG. 16 is a view in side elevation, partly in section, showing the relative location of the camming means associated with the jack when the jack is located in the operative position;

FIG. 17 is a view of certain of the positioning means showing the location thereof when the treadle is fully depressed;

FIG. 23 is a diagrammatic view of the fluid system associated with the heel seat pounding instrumentalities.

Figure 1:
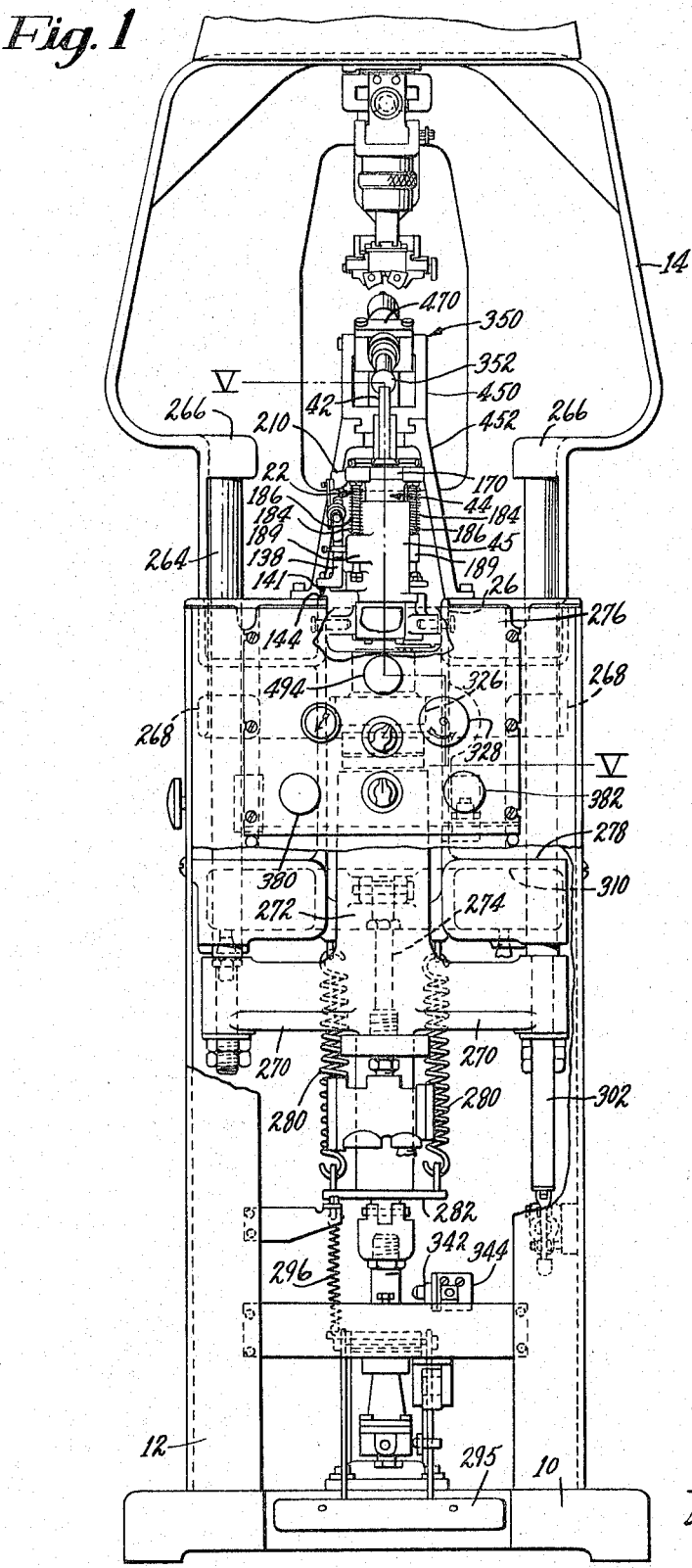
FIG. 1 is a view in front elevation of a machine exemplifying the invention, certain frame portions being cut away to reveal internal mechanisms.

The frame of the illustrative machine comprises a base portion 10 and a housing 12 secured to said base portion. A hood or head 14 is mounted on the housing 12 for movement relative to nail inserting instrumentalities and heel seat pounding instrumentalities, as hereinafter described.

The machine is hereinafter described with reference to the attachment of a heel 16 to a shoe 18 by the use of a drive screw or nail 20 which is driven through the shoe and into the heel. As explained in application for Letters Patent of the United States, Serial No. 142,172, filed October 2, 1961, in the name of Chester E. Rogers, Jr., now Patent No. 3,215,772, it is common practice to attach a heel 16 temporarily to a shoe by a drive screw 20, said heel being attached permanently to the shoe after the last has been removed. The illustrative machine further is described hereinafter with reference to the pounding of the heel seat area 21 of the shoe 18 after the insertion of a drive screw or nail 20 as discussed above.

Figure 2:
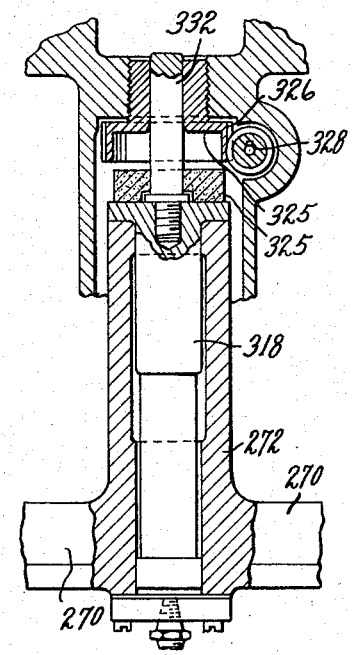
FIG. 2 is an enlarged view, partly in section, of nail driving instrumentalities of the illustrative machine.
Figure 5:
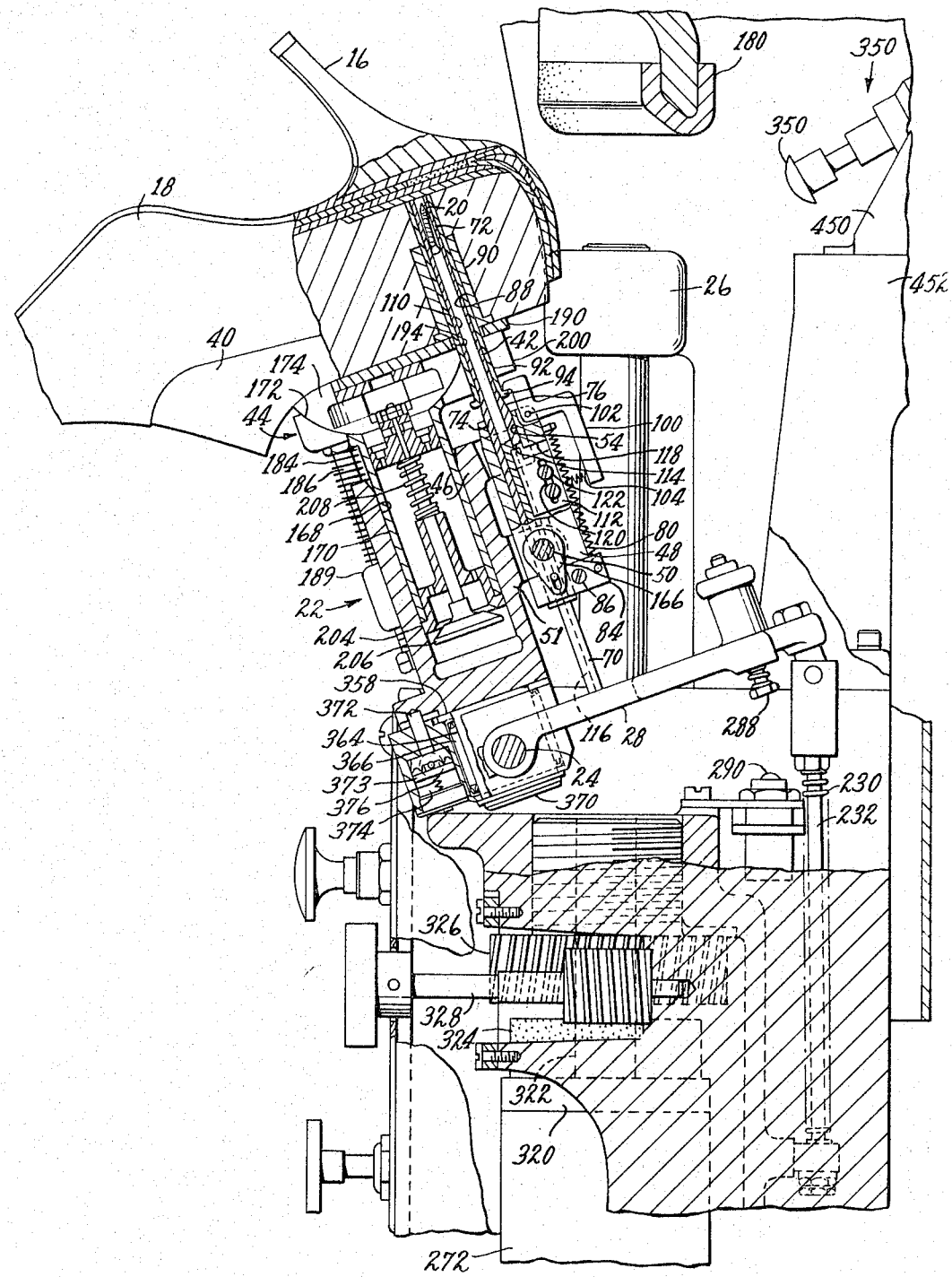
FIG. 5 is a sectional view in side elevation showing the jack in the work receiving position taken along the line V—V of FIG. 1.

A work supporting member or jack 22 is mounted for pivotal movement in a vertical plane on the upper portion of the housing 12 by means of rods 24, 24 (FIG. 13) mounted in bearings 26, 26 secured to the housing 12 and extending into a carrier 28 upon which the jack 22 is carried, said rods being retained in position in the carrier 28 by set screws 30, 30. The carrier 28 extends rearwardly from the pivotal axis of the rods 24, 24 and has drive means attached to the rearward portion thereof, as hereinafter described. The jack is thus pivotal in a vertical plane about the bearings 26, 26 between an upper work receiving position and an operative position. When the jack is located in its work receiving position, as illustrated in FIGS. 2, 5 and 11, positioning of a last 40 thereon is easily accomplished as a result of the operator's ready access thereto, the jack being tilted toward the position normally occupied by the operator, i.e., to the right of FIG. 11.

The work supporting member 22 comprises a hollow spindle 42, a mount 44, means for locking the spindle against movement and for permitting movement of the mount when the jack is in the last receiving position, and means responsive to the movement of the jack from the work receiving position to the operative position for freeing the spindle and restraining the mount. The spindle 42 and the mountings therefor are carried on the carrier 28 and extend through a central cavity therein. The jack or work supporting member 22 is rotatively mounted on the carrier 28 to facilitate the performance of the heel-seat pounding operation, as hereinafter described.

An upstanding housing member 45 is rotatively mounted in the carrier 28 and has projecting rearwardly therefrom a pair of spaced flanges 46, 46 forming abutments for a guide block 48 (FIGS. 5, 6, 13, 14, 16 and particularly 9) which is journalled on a pair of bearing pins 50 extending through a pair of spaced flanges 51, 51 projecting rearwardly from the member 45 at a position beneath the flanges 46, 46. The bearing pins 50 are retained in position in the flanges 51, 51 by pins 52, 52. The guide block 48 extends through the cavity in the carrier 28 and has a cylindrical bore or guideway 54 extending longitudinally thereof. The guide block has a pair of recesses 56, 56a (FIGS. 6 and 9) which receive an end of a plunger 60 which is slidingly mounted in a guideway 62 in one of the flanges 46 and is constantly urged inwardly by a spring 64. The angular setting of the guide block 48 upon the member 45 about the common axis of the bearing pins 50, 50 may be quickly effected by the engagement of the plunger 60 with one or the other of the recesses 56 or 56a. The spindle 42 is slidable in the guideway 54 and, thus, the relative position thereof with respect to the mount 44 can be determined by adjustment of the angular setting of the guide block 48. As more fully described in application for Letters Patent of the United States, Serial No. 142,170, filed October 2, 1961, in the name of Chester E. Rogers, Jr., now Patent No. 3,101,480, this facilitates the adaptation of the work support member to accommodate lasts having passageways extending through the last at different angles to the general plane of the rim of the heel plate of the last.

A driver 70 is mounted in the hollow spindle 42 for reciprocation. The spindle 42 comprises upper and lower cylindrical portions 72, 74 of relatively small and large diameter and a beveled portion 76 joining said upper and lower cylindrical portions. The spindle 42 is adapted to fit slidingly in a passage 78 in a last 79 positioned rearwardly of the usual last pin receiving thimble and disposed at an angle thereto, as illustrated in FIG. 6, and is constantly urged yieldingly upward by a tension spring 80 upper and lower ends of which are attached to studs secured respectively to the guide block 48 and to a foot 84 which is clamped upon the lower end portion of the spindle by a screw 86. Upward movement of the spindle 42 in the block 48 is limited by the engagement of the upper face of the foot with the lower face of the block. Adjustment of the location of the foot 84 on the spindle 42 permits the upper extremity of the spindle to be located at the proper height to support the shoe on the last in a definite relation to the driver 70.

As illustrated in FIGS. 5 and 16, the spindle 42 is sometimes inserted into a passage 88 formed by a last pin receiving thimble 90 and an extension thereof in a last of the type designed herein by the reference character 40. The passage 88 commonly has a slightly greater diameter than the passage 78 in the last 79. When the machine is used to attach a heel to a shoe mounted on a last of the type illustrated by the reference character 40, a sleeve 92 is mounted on the upper cylindrical portion 72 of the spindle 42 and has a flanged lower end 94. When the flanged lower end 94 of the sleeve 92 engages the upper end of the bevel portion 76 of the spindle 42 the upper end of the sleeve is flush with the upper end of the spindle, the outside diameter of the sleeve being such that it fits slidingly in the passage 88 of the last 40.

In order to insure that the sleeve 92 is held in its proper position on the spindle 42 there is provided a latch in the form of a lever 100 which is journalled on a pin 102 secured to the block 48 and has its upper end overlying the flanged lower end 94 of the sleeve. A spring 104, opposite ends of which are housed in recesses in the block and in the lever 100, constantly biasing the upper end of the lever to its operating position over the flanged lower end 94 of the sleeve 92.

The driver 70, during a stroke thereof, sinks a drive screw or nail 20 to the proper depth into the insole and heel 16 of the shoe 18. Downward displacement of the driver 70 in a passage 110 of the spindle 42 is limited by a key 112 (FIG. 5) extending through a slot 114 in the wall of the spindle and lying in a keyway 116 extending longitudinally along the lower portion of the driver. The key 112 lies in a recess 118 which is formed in the guide block 48 and has formed in it a vertical slot 120 through which passes screws 122 which are threaded into the guide block and normally force the key against the bottom of the recess 118 to secure said key in a desired position on the guide block. Initial adjustment of the key 112 is effected to vary the starting position of the driver 70 for the accommodation of drive screws or nails of different lengths.

Figure 9:
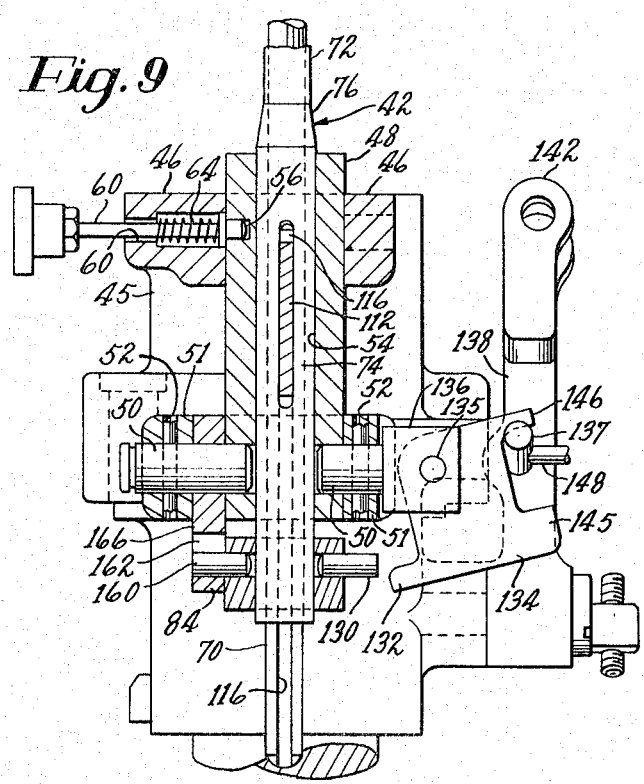
FIG. 9 is an enlarged view, partly in section, of the spindle and the mounting means therefor illustrating the spindle locking means in a retracted position.
Figure 10:
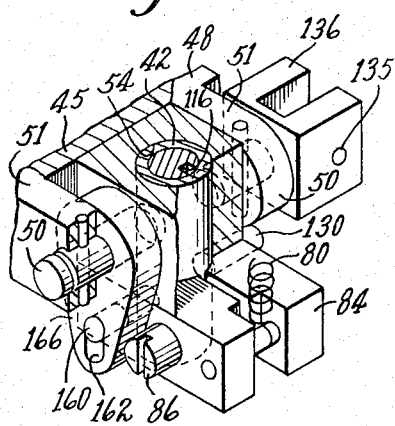
FIG. 10 is a view in perspective, partly in section, showing certain of the spindle support means.
Figure 14:
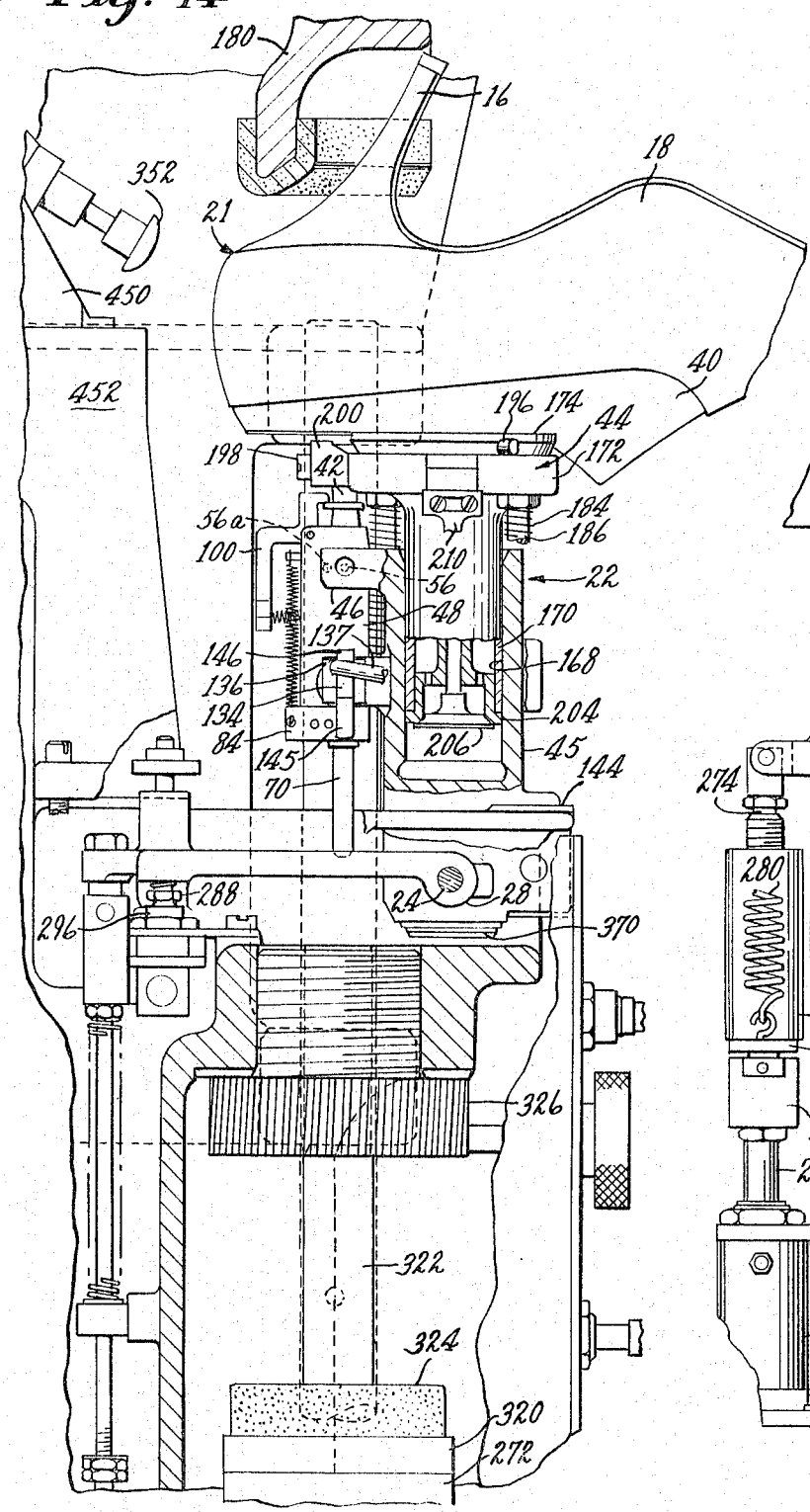
FIG. 14 is a view in side elevation, partly in section, showing the jack in operative position.

When the carrier 28 and, therefore, the work supporting member or jack 22 are located in the upper work receiving position, the spindle 42 is fixed against depression by the engagement of a stud 130 (FIG. 12) located in the foot 84 by a lip 132 of a block 134 (FIGS. 3, 4, 9, 11, 12, 14 and 16). The block 134 is pivotally mounted on a bearing pin 135 positioned in a U-shaped bracket 136 which is secured to one end of one of the bearing pins 50 thereby to permit removal of the lip 132 from engagement with the stud 130. Pivotal movement is translated to the block 134 and, therefore, arcuate translation to the lip 132 in response to the pivotal movement of the carrier 28 by the cooperative action of an elongated stud 137 mounted on a pivotal cam holder 138 and a spring 139, as hereinafter described. The cam holder 138 is pivotally mounted on the housing member 45 by a pin 140 and comprises an essentially L shaped body portion having a camming stud 141 extending from one leg thereof and a bifurcated bracket 142 for supporting a cam formed on the other leg, as hereinafter described in detail. The elongated stud 137 extends rearwardly from the cam holder 138 in position to engage ears 145, 146 extending from the block 134 whereby to effectuate pivotal movement of the block 134 in response to pivotal movement of the cam holder 138. As illustrated in FIG. 12, when the carrier 28 is located in the work receiving position, the camming stud 141 engages a camming surface 144 formed in the frame of the machine whereby the cam holder 138 is pivoted counterclockwise (as viewed in FIGS. 3 and 11) into a position in which the stud 137 engages the lower ear 145 on the block 134 thereby to urge the lip 132 into engagement with the stud 130 to prevent displacement of the spindle. When the carrier 28 and jack 22 thereon are pivoted into operative position, the camming pin 141 is removed from engagement with the surface 144 (FIG. 16) and the cam holder 138 is pivoted clockwise (as viewed in FIG. 16) about the pin 140 under the action of the spring 139 opposite ends of which are secured to a stud 148 mounted on the elongated stud 137 and a stud 149 extending from the housing 45. The elongated stud 137 is thus pivoted into engagement with the upper ear 146 on the block 134 and imparts pivotal movement thereto whereby the lip 132 is removed from the pin 130 and the spindle is free to move (FIG. 9). Removal of the carrier 28 to the work receiving position effects counterclockwise pivotal movement of the cam holder 138 under the action of the camming pin 141 whereby the spindle is locked in position in the manner discussed above.

When the carrier 28 is in the operative position, depression of the spindle 42 is limited by the contact of a stud 160 (FIG. 12) mounted in the foot 84 with the lower surface of a slot 162 cut in a block 166 mounted on one of the bearing pins 50 and interposed between one of the flanges 51 and the guide block 48 on the opposite side of the guide block from the block 134. As stated above, the foot 84 and spindle 42 are urged upwardly by the spring 80 and normally retained in an upper position thereby.

The mount 44 will now be described. Formed in the rotatable housing 45 is a vertical cylinder 168 in which operates a tubular piston 170 having at its upper end an enlargement provided with a spherical depression 172 shaped to receive a complemental lower surface of a bed piece 174 having a planar upper face adapted to support the last by contact with the crown or upper surface of the back cone thereof. The bed piece 174, the cylinder 168 and the piston 170 collectively constitute the mount 44. Depression of a holddown member 180 mounted in the head 14 into contact with a heel of a shoe mounted on the jack 22 intially causes the bed piece 174 to tilt to the proper angular position and then after clamping pressure is applied to the bed piece, as hereinafter described, to be held against displacement on the piston 170 due to the spherical shape thereof.

The bed piece 174 has a radial slot 182 (FIG. 13) through which the spindle may pass in certain angular positions. The piston 170 and the bed piece 174 are normally urged upwardly by a pair of expansion springs 184 surrounding rods 186 which are secured to the upper end of the piston 170 and pass through bores 188 located in mounting pads 189 on the housing 45 (FIG. 13). Upward movement of the piston 170 is limited by contact of nuts threaded onto the rods 186 with the underside of the pads 189. The piston 170 and, thereofre, the bed piece 174 are freely movable in the cylinder 168 when the jack is in the work receiving position thereby permitting adjustment of a last on the spindle and bed piece.

Figure 3:
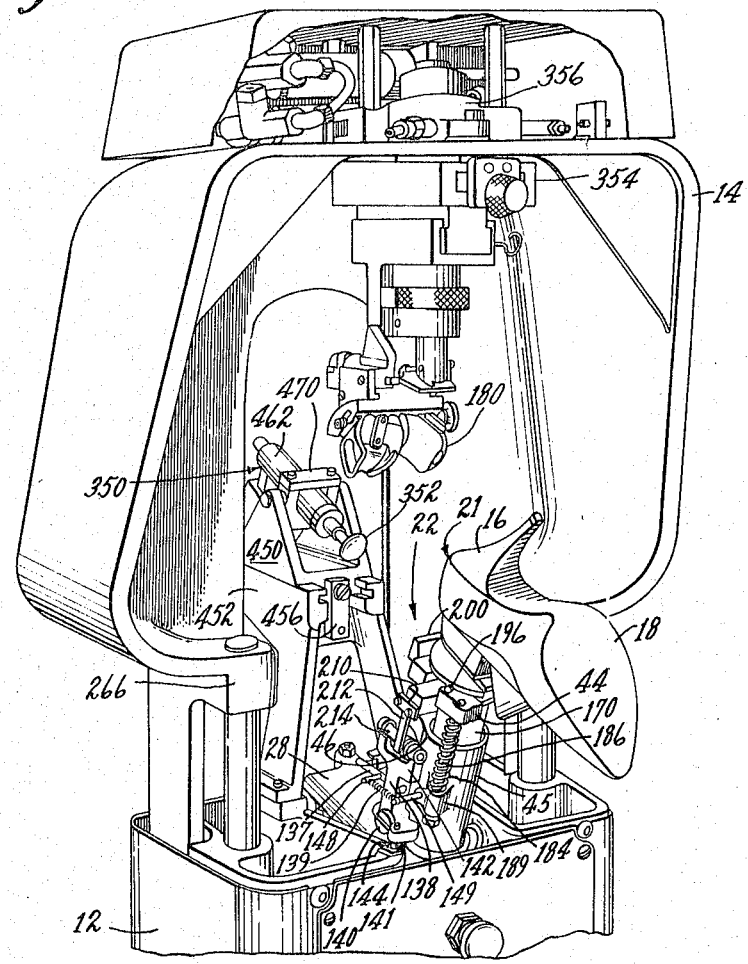
FIG. 3 is a perspective view of the upper portion of the machine with the jack in the work receiving position and the pounding means in a retracted position.
Figure 4:
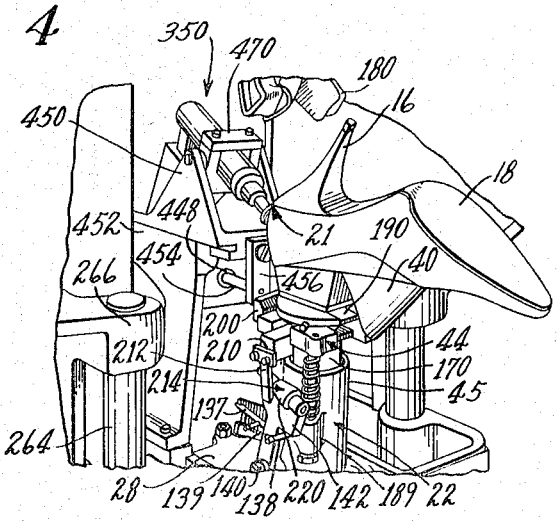
FIG. 4 is a partial perspective view similar to FIG. 3 showing the jack and pounding means in operative position.

In order to insure that the portion of the crown of the back cone of the last 40 or 79 overlying the slot 182 of the bed piece is effectively supported there is provided a slide plate 190 which is movable along a forwardly and rearwardly undercut guideway 192 in the planar upper face of the bed piece and which has formed in it a hold 194 through which the spindle 42 passes freely. In accommodating the last 79, the bed piece 174 may be initially oriented slightly on the tubular piston 170, the upper face of the bed piece during such orientation being inclined slightly downwardly and rearwardly from the horizontal. The bed piece 174 is provided at its forward lateral portions with flanges 196 which are normally in engagement with the flanged upper face of the tubular piston, the upper face of the bed piece at this time being horizontal. The flanges 196 allow the bed piece 174 to tilt slightly backward from its horizontal position as seen in FIG. 3 to accommodate slight variations in the angles of the last passages and/or irregularities in the crowns of the back cones of the lasts but prevent the operator from tipping the forward end of the bed piece 174 downwardly thereby preventing such movement when the last is removed and ensuring the proper location of the bed piece to facilitate positioning of the next last.

The consistent accuracy of the thimble hole 90 and the extension thereof make it unnecessary to provide an initially tiltable bed piece when operating on shoes mounted on lasts of this type and, accordingly, the bed piece may be rigidly secured in its horizontal position to the piston 170 or may be formed integral with said piston. In the illustrated construction it will be noted that when the spindle 42 is in its vertical position, the vertical axis of the thimble is disposed at a substantial distance rearward of the vertical axis of the tubular piston 170 (FIG. 5) and accordingly downward pressure imparted to the slide plate 190 and to the upper face of the bed piece 174 has a tendency to tilt the rear end of the bed piece downwardly against its locking action in the tubular piston 170. With the foregoing in view, the rear end of the flanged upper portion of the tubular piston 170 has secured to it by screws 198 a block 200, the construction being such that when the machine is adjusted for thimble hole work, i.e. when the spindle is inserted through the thimble 90, the slide plate 190 rests upon the upper surface of the block, the flanges 196 of the bed piece 174 at this time resting on the upper face of the tubular piston 170. Accordingly, when operating upon thimble hole work the bed piece 174 is fixed against tilting on the tubular piston 170.

The lower end of the piston 170 has secured to it a valve seat 204 in an axial extension of which a stem of a valve 206 is movable. An expansion spring 208 tends to close the valve 206 and thus the passage through the piston 170. When this occurs the piston is locked against depression by oil in the cylinder 168.

Figure 8:
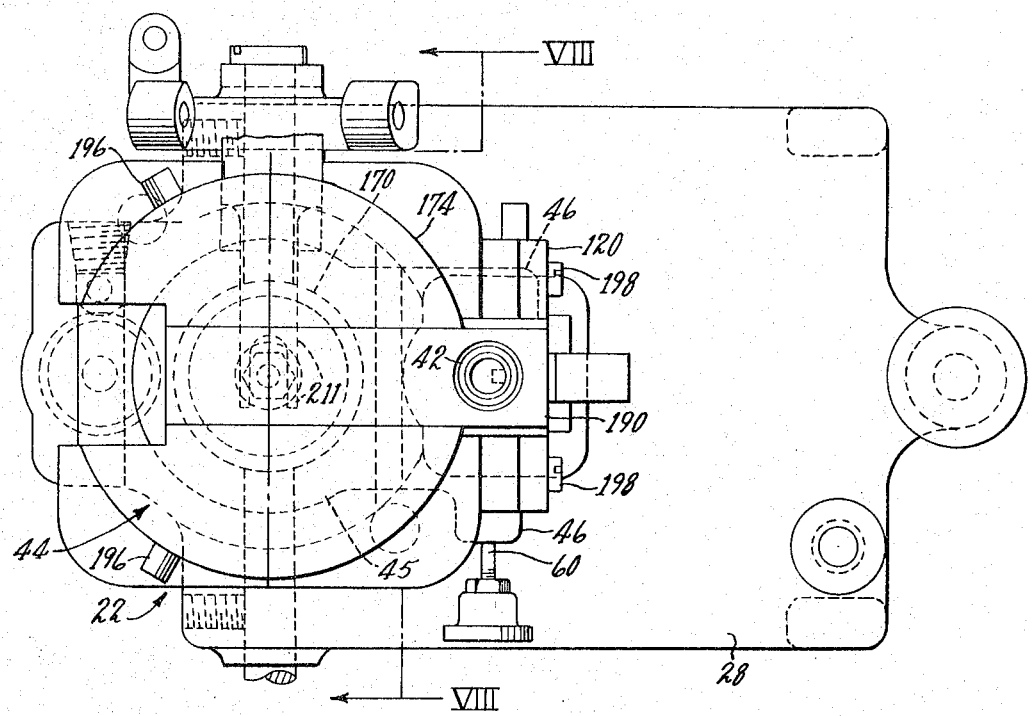
FIG. 8 is a plan view of the jack in the work receiving position.

When the jack 22 is in its work receiving position, the valve 206 is held open by a multipart bell crank lever 210 (FIGS. 8 and 13) fulcrumed on the enlargement of the piston 170, a bifurcated arm 211 of the lever extending between flanges on a stem of the valve 206. The bell crank lever 210 has a depending arm 212 past which a cam rod 214 moves in contact therewith during the pivotal movement of the carrier 28, said cam rod 214 being mounted between the projecting legs of the bifurcated bracket 142 formed in the cam holder 138. Essentially rectilinear movement is imparted to the cam rod 214 when the carrier 28 and, therefore, the cam holder 138 are pivoted in the manner described above in re the operation of the block 134. The cam rod 214 has an enlarged cam surface 220 which engages the arm 212 when the carrier 28 is in the work receiving position thereby to cause the valve 206 to be lowered from its seat due to the pivoted position of the bell crank lever 210. Pivotal movement of the carrier 28 and, consequently, the cam holder 138 into operative position moves the enlarged cam surface 220 out of engagement with the arm 212, the cam 212 being engaged by the cam surface 222 when the carrier 28 is in the operative position. When the arm 212 is in engagement with the cam surface 222 the valve 206 is urged into the closed position under the action of the spring 208. The piston 170 and bed 174 are thus locked against movement when the carrier is in the operative position and free to move when the carrier is in the work receiving position. The alternating positions of the arms 212 are illustrated in FIG. 13.

The holddown member 180 is rotatively mounted on the head 14 for controlling pivotal movement, in a horizontal plane, of a shoe mounted on the jack 22 whereby to facilitate the heel seat pounding operation, as hereinafter described. It is to be noted that the housing 45 and holddown member are mounted for rotation about the same vertical axis. The holddown member may be of any convenient type, the specific design illustrated in the drawings being particularly adapted for use with high style Louis heels. Preparatory to operating upon the work, the holddown member 180 must be adjusted in relation to the jack 22 to accommodate the particular style of heel to be attached, said adjustment being made as described in United States Letters Patent No. 1,545,575, granted July 14, 1925, to John F. Standish.

Figure 22:
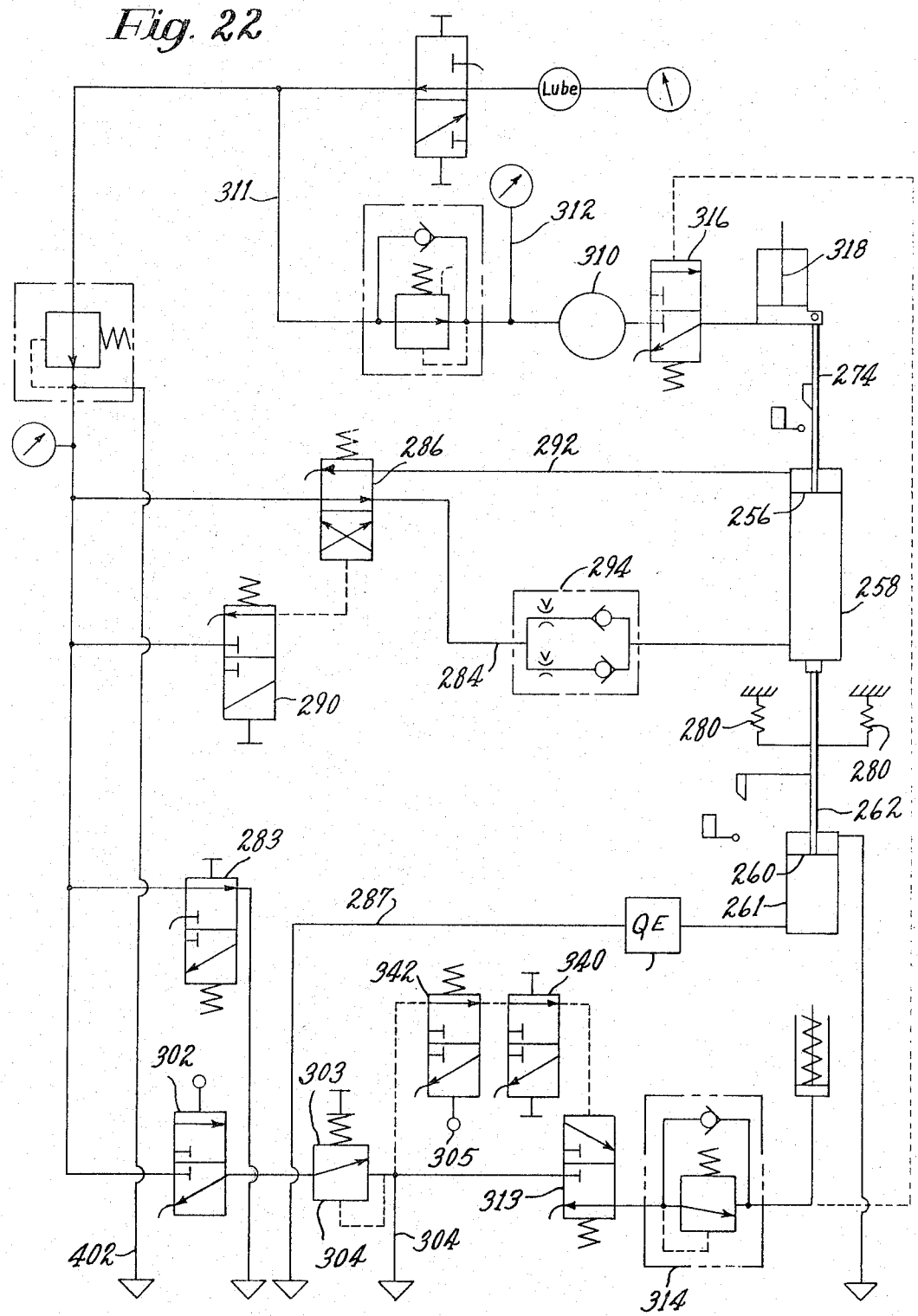
FIG. 22 is a diagrammatic view of the fluid system associated with the nail inserting instrumentalities.

Pivotal movement of the carrier 28 from the work receiving position is controlled by the operator who must manually pivot the jack 22 into operative position against the action of a spring 230 mounted on a shaft 232 opposite ends of which are pivotally mounted on a support member 234 secured to the frame 12 and on the rearward end of the carrier 28. The spring 230 normally urges the carrier 28 into the work receiving position illustrated in FIGS. 3, 5 and 11. The operator, during a given cycle of operation is required to pivot the carrier into the operative position illustrated in FIGS. 4, 6, 14 and 16 and maintain the carrier in said position until it is clamped in position by the holddown member 180, as hereinafter described, Movement of the head 14 is controlled by a two-way piston 256 (FIG. 22) housed in a cylindrical housing 258 (FIGS. 7, 15 and 17) and a one-awy piston 260 housed in a housing 261, the housing 258 being mounted on a drive rod 262 secured to the piston 260. The head 14 is slidingly mounted in the frame 12 for movement toward and away from the jack 22, movement being imparted to the head 14 by the pistons 256 and 260 through a pair of rods 264 opposite ends of which are secured to the head at 266, 268 and to lateral extensions 270 of a housing 272 to which a piston drive rod 274 of the piston 256 is secured. The rods 264 are slidingly mounted in support members 276, 278. The piston 256 moves the head between an upper position and an intermediate position wherein the holddown member 180 is immediately above the jack and a shoe thereon in position to engage a heel on said shoe. The piston 260 is employed to move the head from said intermediate position into a position wherein the holddown member engages and clamps the heel on the shoe.

The piston 260 is normally retained in an upper position by springs 280 opposite ends of which are secured to the lower portion of the support member 278 and to a flange 282 secured to the piston drive rod 262. Fluid pressure is also applied to the lower surface of the piston 260 through the valves 283 and 285 in the line 287 (FIGS. 22 and 23) whereby normally to maintain the piston in an upper position. The piston 256 is normally retained in an upper position by fluid pressure applied to the bottom thereof through a line 284 and controlled by a valve 286 (FIG. 17). The head 14 is thus normally retained in the upper position when the machine is in use. When the carrier 28 is pivoted into operative position by the operator, a contact member 288 secured to the carrier 28 depresses a valve 290 mounted on the support member 234 thereby initiating the application of fluid pressure to the upper surface of the piston 256 through the line 292. The valve 290 is a pilot valve which controls the position of the valve 286. The rate at which the piston 256 is depressed and returned is regulated by a speed control valve 294. As stated above, depression of the piston 256 is translated through the piston rod 274, housing 272 and rods 264 to the head which is lowered to the intermediate position defined above. When the head is in the intermediate position, the operator can examine the alignment of the holddown member with the heel of the shoe mounted on the last and correct any deviations or release the treadle to return the head and carrier in the event deviations exist which cannot be corrected in the intermediate position.

Figure 15:
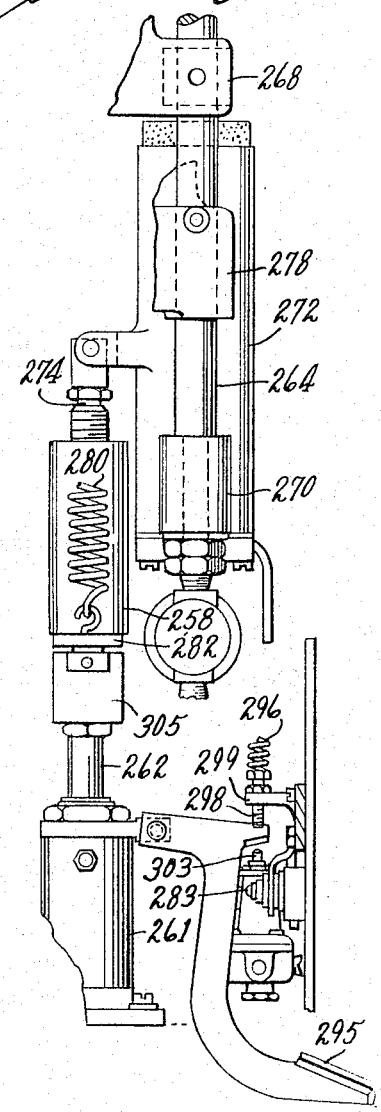
FIG. 15 is a view of certain of the positioning means showing the location thereof when the jack is in operative position subsequent to initial depression of the treadle.

The holddown member 180 on the head 14 is moved into engagement with the heel of a shoe by depression of a treadle 295. The treadle 295 is pivotally mounted on the piston housing 261 and is normally retained in an upper position, as illustrated in FIGS. 7 and 15, by a spring 296 opposite ends of which are secured to a portion of the treadle displaced from the pivot point thereof and to a bracket 297 mounted on the frame 12. The upper position of the treadle 295 is determined by contact thereof with a stop screw 298 mounted in a bracket 299 secured to the frame 12. Initial depression of the treadle 295 releases the return valve 283 whereby fluid pressure is exhausted from the lower chamber of the cylinder 261 through the line 287, a cam valve 302 having previously been opened by the movement of the head 14 to the intermediate position described above whereby to permit flow of fluid pressure therethrough. When the treadle 295 is depressed further, it contacts a plunger on a holddown control regulator 303 whereby fluid pressure is introduced to the upper chamber of the cylinder 261 through the line 304 and applied to the upper surface of the piston 260. Depression of the piston 260 is translated to the cylinder 258 and the connecting members appurtenant thereto through the drive rod 262 threaded into a cam 305 which is secured to the lower portion of said cylinder and, thus, results in depression of the head. When difficulty is encountered in the application of pressure to a heel, the operator can raise the head to the intermediate position by releasing the treadle from contact with the plunger of the regulator 303. The piston is returned to its intermediate position by the springs 280. The holddown pressure is controlled by the regulator 303 and may be varied by the operator by control of the pivoted position of the treadle 295 whereby to regulate the extent of depression of the regulator's 303 plunger.

When the holddown member has clamped the heel on the shoe mounted on the jack 22, pressure is built up within the portion of the fluid system associated with the application of holddown pressure. Pressurized fluid is supplied directly to an accumulator 310 through the line 311 to be used to drive the piston 318 in the manner hereinafter described. A regulator 312 controls the pressure within the accumulator 310. When pressure in that portion of the system associated with the holddown means has reached a predetermined magnitude, a pilot valve 313 regulates a sequence valve 314 which opens a drive operating valve 316 thereby releasing the pressure fluid within the accumulator 310 into the cylinder 272 to drive a piston 318. The piston 318 has a flanged upper portion 320 overlapping the edge of the cylinder 272 into which a plunger 322 is threaded. The plunger 322 contacts the rod 70 and drives the nail as a result of the displacement of the piston 318 by the fluid pressure applied from the accumulator 310. The throw or displacement of the piston is determined by the contact of a shock absorbing member 324 secured to the flanged portion 320 with the lower inner surface 325 of an annular member 326 which is threaded into the support member 324. The outer periphery of the annular member 326 has gear teeth thereon which cooperate with gear teeth located on an adjustment rod 328 thereby facilitating adjustment of the relative position of the member 326 and regulation of the throw of the piston and, therefore, the depth the nail is driven.

A shut-off valve 340 is manually operative to prevent operation of the valve 316 and, therefore, the piston 318. A safety device is provided to prevent the driving of a nail when a shoe has not been placed on the jack 22 comprising the cam 305 and a cam operated valve 342 mounted on the frame 12 by a bracket 344. The valve 342 is so positioned that the cam 305 will not actuate it unless the head is displaced a distance incompatible with the pressure of a shoe on the jack, the head being brought into engagement with the shoe by depression of the rod 262 by the piston 260. An interlock system (not shown) may be provided to prevent the depression of the piston 258.

The heel seat of a shoe mounted on the jack 22 is pounded to smooth the surface thereof by pivoting the jack assembly in a horizontal plane relative to pounding instrumentalities, generally indicated by the reference character 350, whereby the heel seat portion of the shoe is exposed to the oscillatory pounding stroke of a pounder 352. Pivotal movement of the jack 22 in a horizontal plane is facilitated by the rotative mounting of the housing 45 on the carrier 28 and the rotative mounting of a support member 354 upon which the holddown member 180 is mounted in the upper portion of the head 14. When the head 14 is in the depressed, operative position wherein the holddown member 180 is in engagement with the heel of a shoe located on the jack, the jack 22 and shoe thereon may be pivoted by drive means which impart pivotal movement to the support member 354, and, therefore, through the shoe and jack to the housing 45 whereby said members are pivoted as a unit in a horizontal plane as hereinafter discussed.

The housing 45 and support member 354 are rotatively mounted on the carrier 28 and on a mounting member 356 located in the head 14 on thrust bearings 358, 360, respectively, see FIGS. 5, 13, 18 and 19, respectively. The thrust bearings 358, 360 support the respective members with which they are associated and absorb the thrust resulting from the nail driving operation. The jack 22 and support member 354 each have a shank 362, 364 depending therefrom which is received in a bore in the carrier 28 and mounting member 356, respectively. Each of the shanks 362, 364 is engaged by roller bearings 366, 366 mounted in said bores to maintain axial alignment during pivotal movement of the jack 22. The shanks 362, 364 are secured in position by snap rings 370. The jack assembly is normally maintained in the vertical plane defined by the pivotal movement of the jack between the work loading position and the nail driving position by lock pins 372, 372 mounted in the carrier 28 and mounting member 356 and engageable within cavities in the housing 45 and support member 354, respectively. The lock pins 372, 372 constitute piston rods associated with pistons 373, 373 housed in cylinders 374, 374 formed in the carrier 28 and mounting member 356. The lock pins are normally urged into the cavities in the housing 45 and support member 354 by springs 376, 376 interposed between the bottom of said cylinders and recesses 378, 378 in the lock pins 372, 372. Retraction of the lock pins 372, 372 is accomplished by the application of fluid pressure to the upper surface of the pistons 373, 373 in a manner to be described hereinafter.

The operator initiates pounding by pressing a button on the front of the machine after a nail has been driven. This is completed by the operator with the treadle 295 depressed in order to retain the head 14 in locking engagement with the heel of a shoe mounted on the jack 22. The operator may elect manually to impart horizontal pivotal movement to the jack 22 by depression of a button 380 or may utilize an automatic pounding cycle by depression of a bottom 392. The manual cycle is normally employed where specific areas of the heel seat require particular attention. The manual and automatic cycles of operation will now be individually described with reference to FIG. 23.

When the operator elects the automatic cycle of operation and depresses the button 382, the automatic system control valve 400 is actuated and fluid pressure flows therethrough through the line 402. The flow of fluid pressure to the valve 400 is regulated by the valve 404 and the interlock control valve 406. The head 14 is thereafter locked in position as the valve 400 pilots the valve 408 which maintains the holddown pressure. Fluid pressure is also supplied through the metering valve 410 to the cylinders 374, 374 to retract the lock pins 372, 372 thereby to permit horizontal pivotal movement of the jack 22 as discussed above.

Figure 18:
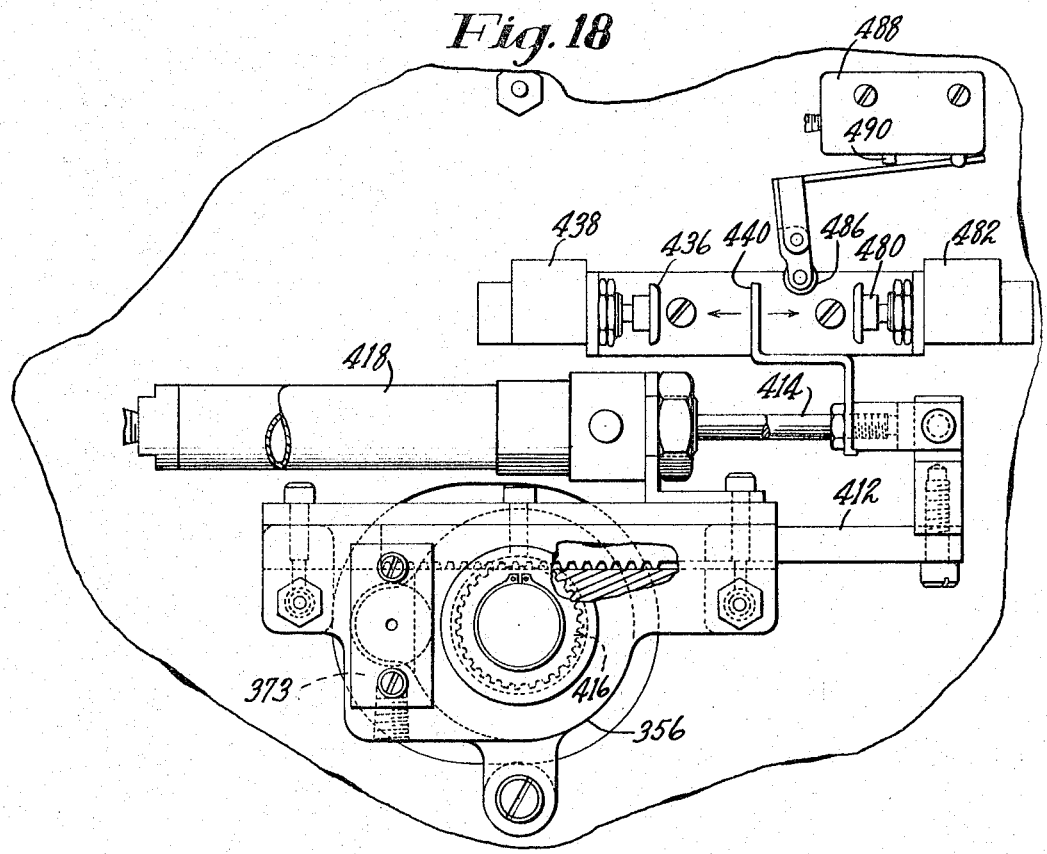
FIG. 18 is a plan view of the drive means for imparting pivotal movement to the holddown means.
Figure 19:
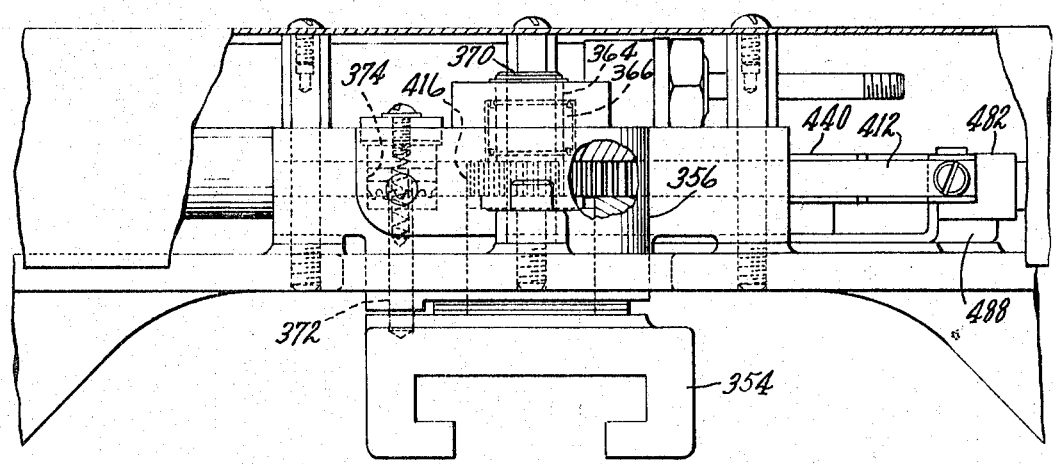
FIG. 19 is a front elevation of the drive means shown in FIG. 18.
Figure 20:
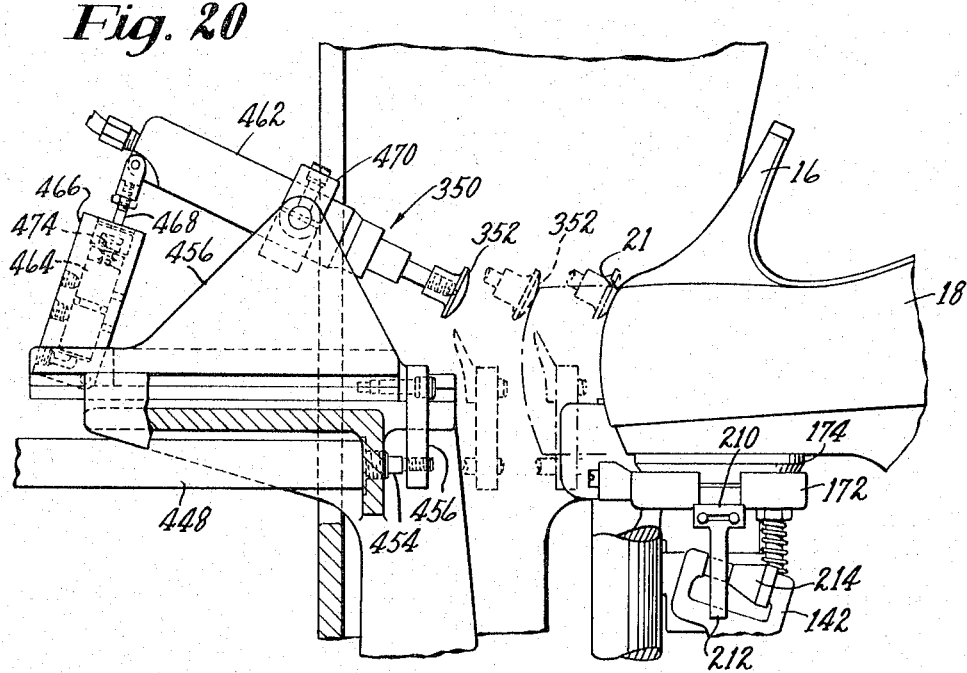
FIG. 20 is a side elevation illustrating the relative positioning of the pounding means and jack when the jack is located in the operative position.
Figure 21:
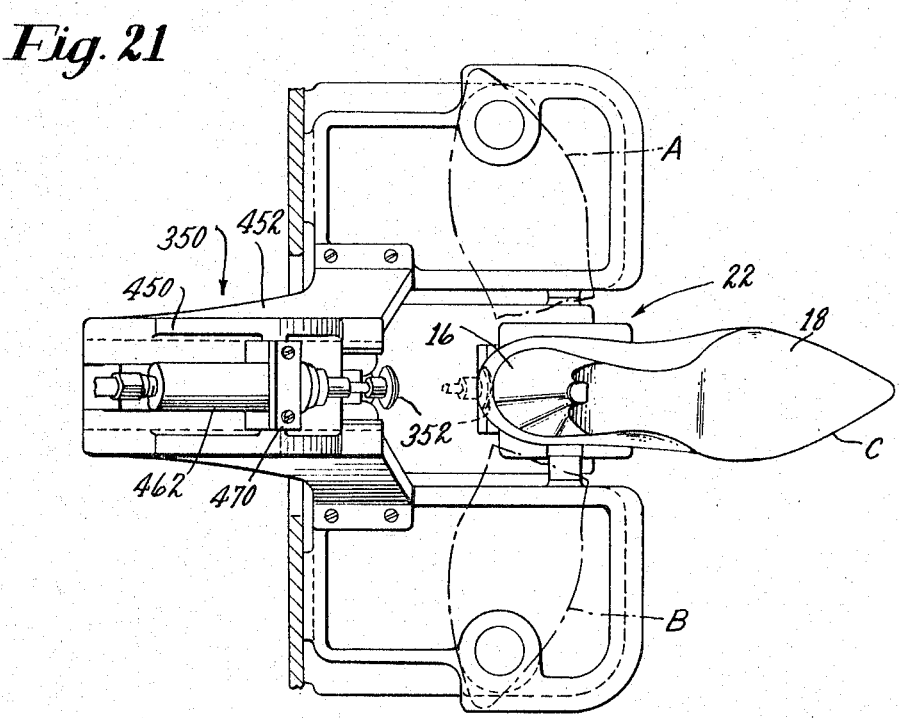
FIG. 21 is a plan view of the pounding means and jack illustrating, in phantom, the terminal positions occupied by the jack during the automatic pounding cycle.

Horizontal pivotal movement is imparted to the support member 354 by a rack 412 mounted on the end of a piston rod 414 which cooperates with a pinion 416 formed on the shank 364 depending from the support member 354 (FIGS. 18 and 19). The piston rod 414 is secured to a piston 417 (FIG. 23) housed in a cylinder 418 mounted on the upper surface of the head 14. The rack 412 is slidably mounted in a raceway in the mounting member 356 in position to mesh with the teeth on the pinion 416. In the preferred embodiment illustrated in FIG. 23, the fluid pressure system is motivated by air and a second drive cylinder 420 is employed in tandem with the cylinder 414 to facilitate the impartation of movement to the rack 412 without the discontinuities in movement which would exist if a single air operated cylinder were used. That is, the exhaust ends of the cylinders 414, 420, the left hand ends as viewed in FIG. 23, are isolated from the air system and are operated by a closed fluid system which uses oil comprising a bypass valve 422 and speed control valves 424, 424. Oil exhausted from the left hand side of cylinder 418 passes through the closed circuit to the left hand end of cylinder 420. The presence of the oil overcomes the discontinuities or shock effects which would exist if air were used per se, i.e. the relative incompressibility of the oil overcomes the effect of the air's compressibility. Fluid pressure is normally applied to the right hand end of the piston 417 (as viewed in FIG. 23) during the entire cycle of operation of the machine through the operating valve 430 in the line 432. The piston 417 and, therefore, the piston rod 414, rack 412 and jack 22 are maintained in the positions illustrated in FIGS. 23 and 20 during the nail driving portion of the cycle of operation by the lock pins 372, 372 despite the existence of the fluid pressure just described. When the lock pins 372, 372 are retracted in the manner described above, the piston 417 is urged to the right under the influence of the fluid pressure applied through the line 432. Accordingly, the piston rod 414 translates the movement of the piston 416 into counterclockwise rotational movement of the support member 354 through the interaction of the rack 412 and pinion 416. The jack 22 and a shoe mounted thereon are thus pivoted into a "start" position A illustrated in FIG. 21 in location for initiation of the pounding cycle.

The actual pounding operation is initiated by engagement of a plunger 436 of a valve 438 by a camming member 440 mounted on the piston rod 414. The camming member 440 is located on the piston rod to engage the plunger 436 when the piston 416 has completed its initial movement to the right and the jack 22 is in the "start" position as discussed above. When the valve 438 is actuated by the depression of the plunger 436, it pilots the valve 430 and fluid pressure is introduced to the line 442 whereby the pounder 352 is moved into operative position by the application of pressure to a piston 446 housed in a cylinder 448. The pounding instrumentalities 350 are pivotally mounted on a U-shaped bracket 450 which is slidingly mounted on an upstanding support bracket 452. The cylinder 448 is mounted in the support bracket 452 and has a piston rod 454 extending from one end thereof opposite ends of which are secured to the piston 446 and to a block 456 which is secured to the U-shaped bracket 450. Application of pressure to the piston 446 thus moves the bracket 450 to the right, as viewed in FIGS. 20 and 21 and urges the pounder 352 into engagement with a shoe mounted on the jack. The stroke of the piston 446 is such that the pounder 352 will engage the heel seat area of a shoe mounted on the jack 22 prior to the traverse of the complete stroke by the piston 446. The pounder will thus be urged into engagement with the heel seat area of the shoe with a force proportional to that applied on the piston 446. The fluid pressure or force applied to the piston 446 is regulated by the valve 458. Spring means 460 (FIG. 23) are employed normally to maintain the piston 446 in position wherein the pounder is in the inoperative position illustrated in FIG. 3.

Simultaneously with the application of fluid pressure to the piston 446, fluid pressure is applied directly to the pounder assembly 462 whereby reciprocatory translation is imparted to the pounder 352. The pounder assembly 462 is of any convenient commercially available type and, therefore, is shown only schematically in FIG. 23. Pressure is also simultaneously applied to a piston 464 housed in a cylinder 466 mounted on the rear of the U-shaped bracket 450. A piston rod 468 attached to the piston 464 and extending from the cylinder 466 is secured to the end of the pounder assembly 462, said pounder assembly being pivotally mounted on the bracket 450 by a support bracket 470. A regulating valve 472 controls the application of pressure to the piston 464 whereby the piston 464 is moved a full stroke to the right as viewed in FIG. 23, pressure relieved and the piston returned under the action of a spring 474, and fluid pressure again applied to the piston 464. This sequence is continuously repeated during the pounding operation and the pounder assembly is thus pivoted in the bracket 450 whereby oscillotary movement is imparted to the pounder 352. When the valve 438 is actuated, the pounder 352 is thus urged into engagement with the heel seat of a shoe mounted on the jacket 22 which is located in the "start" position, the pounder being continuously reciprocated and oscillated whereby the heel seat is exposed in toto to a smoothing action.

Actuation of the valve 438 also pilots a time control valve 474 which permits the flow of fluid pressure to the right hand end of cylinder 420 through the line 476 after a predetermined period required for the movement of the pounder 352 into the operative position described above. Upon the elapse of the prescribed time interval, fluid pressure is introduced to the cylinder 420 through the valve 474 whereby the fluid pressure established in the closed fluid system described above urges the piston 417 to the right as viewed in FIG. 23, the flow of fluid pressure to the cylinder 418 through the line 432 being eliminated when the valve 438 pilots the valve 430. The piston rod 414 translates the movement of the piston 417 to the rack 412 which cooperates with the pinion 416 to impart clockwise rotation to the support member 354 and, therefore, the jack 22. The jack 22 is pivoted from the "start" position A illustrated in FIG. 21 to the position B during the stroke of the piston 417. The heel seat area 21 of a shoe mounted on the jack 22 is thus completely exposed to the oscillatory stroke of the pounder 352. The time control valve 474 also functions to return the jack 22 to the work receiving position after an interval of time required to complete the cycle and return the jack to the original position illustrated at C in FIG. 21, as hereinafter described.

When the piston 417 has completed the stroke resulting from application of pressure of the cylinder 420 through the line 476, the camming member 440 engages a plunger 480 of a valve 482 which pilots the valve 430 thereby to effect the application of fluid through the line 432 to the cylinder 418 and to close the valve 474 to stop the application of fluid pressure to the cylinder 420 whereby the direction of movement of the piston 417 is reversed and counterclockwise rotation is imparted to the jack 22. During the return of the piston 417 and camming member 440 to the initial positions illustrated in FIGS. 23 and 18, respectively, the camming member 440 contacts a cam follower 486 which actuates a valve 488 by depression of the plunger 490. The valve 488 pilots the valve 400 which eliminates the application of fluid pressure to the pistons 373, 373 thereby to permit the locking pins 372, 372 to be urged into position to enter the cavities in the housing 45 and mounting member 354 under the action of the springs 376, 376 when the jack returns to the position C illustrated in FIG. 21. This operation is completed prior to the return of the jack 22 to the position C and the locking pins 372, 372 ride along arcuate paths on the housing 45 and member 354 until they move into alignment with said cavities. The reciprocatory and oscillatory movement of the pounder is stopped and the pounder is removed to the inoperative position when the valve 430 is piloted by the valve 482. Upon the elapse of a predetermined interval, the time delay valve 474 opens the valve 408 to permit the head 14 to return to the inoperative position and the jack 22 to pivot into the work loading position under the action of the spring 230, the operator having released the treadle 295 after the valve 408 locked the head in position at the initiate of the pounding cycle. The time interval determined by the time delay valve 474 is sufficient to permit the return of the jack 22 to the position C in FIG. 21. The pounding cycle is thus automatically completed and the head 14 and jack 22 returned and the fluid system returned to its initial condition.

If the operator desires manually to complete the pounding operation and depresses the button 380, the manual system control valve 490 is actuated and fluid pressure is removed from the automatic control members discussed above. A valve 492 must be manually operated by depression of the button 494 on the face of the machine to release the locking pins 372, 372 by the application of fluid pressure to the pistons 373, 373. Actuation of the valve 492 pilots the by-pass valve 422 allowing unimpeded manual rotation of the jack 22. The actuated valve 492 also pilots the valve 496 which maintains the holddown pressure and locks the head 14 in position. The pounder is moved into position and the reciprocatory and oscillatory movements described above are now initiated by the manual activation of the pounder control valve 498 which pilots the valve 500. The operator may now manually pivot the jack 22 and shoe thereon into any desired position to complete the heel seat pounding operation at his discretion. The operator may thus correct any imperfections in particular areas of the heel seat. It is to be noted that the operator may switch to manual heel seat pounding after completion of automatic heel seat pounding by depression of the treadle 295 prior to the completion of the automatic cycle and subsequently initiating the manual cycle in the manner described above. Release of the button 494 deactivates the valve 492 thereby returning the pounder and releasing the head 14. The jack 22 must manually be returned to the locked position.

In the operation of the machine, a shoe and a heel to be attached thereto are mounted on the jack 22 with the spindle in position in the last passage, the mount 44 being movable to facilitate positioning of the last and the spindle fixed to establish the proper location thereof. The jack 22 is then pivoted into the operative position by the operator thereby releasing the spindle and locking the mount in position. When the carrier 28 is in operative position, the valve 290 is depressed by the contact member 288 and the piston lowers the head 14 into an intermediate position in location for the holddown member to engage the heel. The operator now depresses the treadle 295 and the holddown member engages the heel to clamp it on the shoe due to the depression of the piston 260 and pressure is built up in the holddown system and at a certain predetermined level releases the pressure in the accumulator to drive the nail. The operator, while maintaining the treadle in the depressed position, elects the desired pounding cycle. If the automatic pounding cycle is selected, the head is locked in position, the lock pins 372, 372 removed, and the jack 22 and shoe thereon automatically moved to the start position A. The pounder 352 is then automatically moved into engagement with the heel seat of the shoe and reciprocatory and oscillatory movement imparted thereto. The jack 22 is then automatically pivoted clockwise whereby the entire heeel seat of the shoe is exposed to the pounder 352. When the jack 22 reaches the position B, the pounder 352 is retracted and the movements thereof stopped. The jack 22 is thereafter returned to the position C, the lock pins returned, and the head 14 and jack 22 released upon completion of the cycle. If the manual cycle is selected, the appropriate button is depressed and the automatic system is isolated. The valve 492 is manually activated by depression of a button, the holddown locked in position, the lock pins retracted and the valve 422 opened. The valve 492 pilots the valve 488 and the pounder is moved into position, oscillatory and reciprocatory movement being imparted thereto. The operator may pivot the jack 22 to any desired position and complete the pounding operation. Upon completion of the operation, the button 492 is released and the head 14 and jack 22 are returned with the lock pins in position.

Having thus described my invention, what I claim as new and desire to secure by Letters Patent of the United States is:

1. In a heel attaching and heel seat pounding machine comprising a jack movable between a work receiving position and a heel attaching position, holddown means movable into and out of engagement with the heel of a shoe mounted on the jack when the jack is located in the heel attaching position to clamp the heel on the shoe, and means for inserting attaching means into said heel and shoe, means for pounding the heel seat of the shoe mounted on said jack and means mounting said jack for pivotal movement relative to said pounding means whereby the total heel seat area of the shoe mounted on said jack is exposed to said pounding means.

2. In a heel attaching and heel seat pounding machine comprising a jack movable between a work receiving position and a heel attaching position, holddown means movable into and out of engagement with the heel of a shoe mounted on the jack when the jack is located in the heel attaching position to clamp the heel on the shoe, and means for inserting attaching means into said heel and shoe, means for pounding the heel seat of the shoe mounted on said jack, means for urging said pounding means into operative position relative to a heel mounted on said jack, means for imparting reciprocatory movement to said pounding means, means for imparting oscillatory movement to said pounding means, and means mounting said jack for movement relative to said pounding means whereby the total heel seat area of the shoe mounted on the jack is exposed to said pounding means.

3. In a heel attaching and heel seat pounding machine comprising a jack movable between a work receiving position and a heel attaching position, holddown means movable into and out of engagement with the heel of a shoe mounted on the jack when the jack is located in the heel attaching position to clamp the heel on the shoe, and means for inserting attaching means into said heel and shoe, locking means for restricting movement of the jack during the cycle associated with the attaching operation to ensure alinement thereof relative to the holddown means and inserting means, means for releasing said locking means to permit the heel seat pounding operation, means for pounding the heel seat of the shoe mounted on said jack, means for urging said pounding means into operative position relative to a heel mounted on said jack and means mounting said jack for movement relative to said pounding means whereby the total heel seat area of a shoe mounted on the jack may be exposed to said pounding means.

4. In a heel attaching and heel seat pounding machine comprising a jack movable between a work receiving position and a heel attaching position, holddown means movable into and out of engagement with the heel of a shoe mounted on the jack to clamp the heel on the shoe, and means for inserting attaching means into said heel and shoe, means for pounding the heel seat of the shoe mounted on said pack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation to ensure alinement thereof relative to the inserting means, means for releasing said locking means to permit the heel seat pounding operation, means for urging said pounding means into operative position relative to a heel mounted on said jack, and means for imparting a pounding stroke to said pounding means.

5. In a heel attaching and heel seat pounding machine comprising a jack movable between a work receiving position and a heel attaching position, holddown means movable into and out of engagement with the heel of a shoe mounted on the jack to clamp the heel on the shoe and means for inserting attaching means into said heel and shoe, means for pounding the heel seat of the shoe mounted on said jack, means mounting said holddown means and mounting said jack permitting movement thereof whereby a shoe mounted on said jack and clamped in position by said holddown means may be translated relative to said pounding means, means for urging said pounding means into operative position relative to a heel mounted on said jack, and means for translating said jack, holddown means and a shoe clamped therebetween relative to said pounding means whereby the total heel seat area of the shoe is exposed to said pounding means.

6. In a heel attaching and heel seat pounding machine comprising a jack movable between a work receiving position and a heel attaching position, holddown means movable into and out of engagement with the heel of a shoe mounted on the jack to clamp the heel in the shoe, and means for inserting attaching means into said heel and said shoe, means for pounding the heel seat of the shoe mounted on said pack, means mounting said holddown means permitting pivotal movement thereof, means mounting said pack permitting pivotal movement thereof whereby a shoe mounted thereon and clamped in position by said holddown means may be pivoted relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said pack, means for imparting a pounding stroke to said pounding means, and means for pivoting said jack, holddown means and a shoe clamped therebetween relative to said pounding means whereby the total heel seat area of the shoe is exposed to said pounding means.

7. In a heel attaching and heel seat pounding machine comprising a jack movable between a work receiving position and a heel attaching position, holddown means movable into and out of engagement with the heel of a shoe mounted on the jack to clamp the heel on the shoe, and means for inserting attaching means into said heel and shoe, means for pounding the heel of the shoe mounted on said jack, means mounting said holddown means and means mounting said jack permitting movement thereof whereby a shoe mounted on said jack and clamped in position by said holddown means may be translated relative to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

8. In a heel attaching and heel seat pounding machine comprising a jack movable between a work receiving position and a heel attaching position, holddown means movable into and out of engagement with the heel of a shoe mounted on the jack to clamp the heel on the shoe, and means for inserting attaching means into said heel and shoe, means for pounding the heel seat of the shoe mounted on said jack, means mounting said holddown means and means mounting said jack permitting movement thereof whereby a shoe mounted on said jack and clamped in position by said holddown means may be translated relative to said pounding means, locking means for restricting the movement of the jack and holddown means during the operative cycle associated with heel attaching, to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle wherein particular portions of the heel seat of a shoe mounted on the jack may be exposed to said pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

9. In a heel attaching and heel seat pounding machine comprising a jack movable between a work receiving position and a heel attaching position, holddown means movable into and out of engagement with the heel of a shoe mounted on the jack to clamp the heel on the shoe, and means for inserting attaching means into said heel and shoe, means for pounding the heel seat of a shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation, to ensure alinement thereof relative to the inserting means, means for releasing said locking means to permit the heel seat pounding operation, means for urging this pounding means into operative position relative to a heel mounted on said jack, means for imparting a repetitive pounding stroke to said pounding means, means permitting the selecting of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for pivoting said jack, holddown means and a shoe clamped therebetween relative to said pounding means in the automatic pounding cycle.

10. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel in position, means for pounding the heel seat of a shoe mounted on said jack and means facilitating pivotal movement of the jack relative to said pounding means whereby the total heel seat area of a shoe mounted on said jack is exposed to said pounding means.

11. In a heel attaching and heel seat pounding machine comprising a jack pivotal between a work receiving position and an operative position, means located on said jack for mouning and supporting a shoe and heel to be attached thereto, holddown means movable toward and away from said jack, means for moving said holddown means into engagement with said heel to clamp the heel on the shoe, locking means for restricting movement of the jack during the cycle associated with the attaching operation, to ensure alinement thereof relative to the holddown means and inserting means, means for releasing said locking means to permit the heel seat pounding operation, means for pounding the heel seat of the shoe mounted on said jack, means for urging said pounding means into operative position relative to a heel mounted on said jack, and means mounting said jack for movement relative to said pounding means whereby the total heel seat area of a shoe mounted on the jack may be exposed to said pounding means.

12. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel on the shoe, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation, to ensure alinement thereof relative to the inserting means, means for releasing said locking means to permit the heel seat pounding operation, means for urging said pounding means into operative position relative to a heel mounted on said jack, and means for imparting a pounding stroke to said pounding means.

13. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel on the shoe, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting the movement of the jack and the holddown means during the operative cycle associated with heel attaching, to ensure alinement thereof relative to the inserting means, means for releasing said locking means to permit the heel seat pounding operation, means for urging said pounding means into operative position relative to a heel mounted on said jack, means for imparting a pounding stroke to said pounding means, and means for pivoting said jack, holddown means and a shoe clamped therebetween relative to said pounding means whereby the total heel seat area of the shoe is exposed to said pounding means.

14. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel on the shoe, means for pounding the heel of a shoe mounted on said jack, means mounting said jack permitting movement thereof whereby a shoe mounted on said jack and clamped in position by said holddown means may be translated relative to said pounding means, means permitting the selection of a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

15. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel on the shoe, means for pounding the heel seat of a shoe mounted on said jack, means mounting said holddown means and means mounting said jack permitting movement thereof whereby a shoe mounted on said jack and clamped in position by said holddown means may be translated relative to said pounding means, locking means for restricting the movement of the jack and the holddown means during the operative cycle associated with heel attaching to ensure alinement thereof relative to the inserting means, means for releasing said locking means to permit completion of the heel seat pounding operation, means for urging said pounding means into operative position relative to a heel mounted on said jack, means for imparting a repetitive pounding stroke to said pounding means, means permitting the selection of either a manual pounding cycle wherein particular portions of the heel seat of a shoe mounted on the jack may be exposed to said pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

16. In a heel attaching and heel seat pounding machine comprising a jack pivotal between a work receiving position and an operative position, means located on said jack for mounting and supporting a shoe and heel to be attached thereto, holddown means movable toward and away from said jack, means for moving said holddown means into engagement with said heel to clamp the heel on the shoe, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation, to ensure alinement thereof relative to the inserting means, means for releasing said locking means to permit the heel seat pounding operation, means for urging said pounding means into operative position relative to a heel mounted on said jack, and means for imparting a pounding stroke to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for pivoting said jack, holddown means and a shoe clamped therebetween relative to said pounding means in the automatic pounding cycle.

17. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-engaging position, means for moving said holddown means into engagement with said heel to clamp the heel on the shoe, and means operative in response to the clamping of said heel to insert attaching means into said heel and shoe, means for pounding the heel seat of the shoe mounted on said jack and means mounting said jack for pivotal movement relative to said pounding means whereby the total heel seat area of the shoe mounted on said jack is exposed to said pounding means.

18. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-engaging position means for moving said holddown means into engagement with said heel to clamp the heel on the shoe, and means operative in response to the clamping of said heel to insert attaching means into said heel and shoe, locking means for restricting movement of the jack during the cycle associated with the attaching operation to ensure alinement thereof relative to the holddown means and inserting means, means for releasing said locking means to permit the heel seat pounding operation, means for pounding the heel seat of the shoe mounted on said jack, means for urging said pounding means into operative position relative to a heel mounted on said jack, and means mounting said jack for movement relative to said pounding means whereby the total heel seat area of a shoe mounted on the jack may be exposed to said pounding means.

19. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-engaging position, means for moving said holddown means into engagement with said heel to clamp the heel on the shoe, and means operative in response to the clamping of said heel to insert attaching means into said heel, means for pounding the heel seat of the shoe mounted on said jack, means mounting said holddown means and means mounting said jack permitting movement thereof whereby a shoe mounted on said jack and clamped in position by said holddown means may be translated relative to said pounding means, means for urging said pounding means into operative position relative to a heel mounted on said jack, and means for translating said jack, holddown means and a shoe clamped therebetween relative to said means whereby the total heel seat area of the shoe is exposed to said pounding means.

20. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-engaging position, means for moving said holddown means into engagement with said heel to clamp the heel on the shoe, and means operative in response to the clamping of said heel to insert attaching means into said heel, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said jack, means for imparting a pounding stroke to said pounding means, and means for pivoting said jack, holddown means and a shoe clamped therebetween relative to said pounding means whereby the total heel seat area of the shoe is exposed to said pounding means.

21. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-enging position, means for moving said holddown means into engagement with said heel to clamp the heel on the shoe, and means operative in response to the clamping of said heel to insert attaching means into said heel, means for pounding the heel of a shoe mounted on said jack, means mounting said holddown means and means mounting said jack permitting movement thereof whereby a shoe mounted on said jack and clamped in position by said holddown means may be translated relative to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

22. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel-engaging position, means for moving said holddown means into engagement with said heel to clamp the heel on the shoe, and means operative in response to the clamping of said heel to insert attaching means into said heel, means for pounding the heel seat of the shoe mounted on said jack, means mounting said holddown means and means mounting said jack permitting movement thereof whereby a shoe mounted on said jack and clamped in position by said holddown means may be translated relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle wherein particular portions of the heel seat of a shoe mounted on the jack may be exposed to said pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

21

23. In a heel attaching and heel seat pounding machine comprising a jack pivotal between a work receiving position and an operative position, means located on said jack for mounting a shoe and heel to be attached thereto, holddown means movable toward and away from said jack, means responsive to the presence of said jack in operative position to move said holddown means toward heel engaging position, means for moving said holddown means into engagement with said heel to clamp the heel on the shoe, and means operative in response to the clamping of said heel to insert attaching means into said heel, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for pivoting said jack, holddown means and a shoe clamped therebetween relative to said pounding means in the automatic pounding cycle.

24. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel seat of a shoe mounted on said jack and means mounting said jack for pivotal movement relative to said pounding means whereby the total heel seat area of a shoe mounted on said jack is exposed to said pounding means.

25. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, locking means for restricting movement of the jack during the cycle associated with the attaching operation to ensure alinement thereof relative to the holddown means and inserting means, means for releasing said locking means to permit the heel seat pounding operation, means for pounding the heel seat of the shoe mounted on said jack, means for urging said pounding means into operative position relative to a heel mounted on said jack, and means mounting said jack for movement relative to said pounding means whereby the total heel seat area of a shoe mounted on the jack may be exposed to said pounding means.

26. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel seat of the shoe mounted on said jack, means mounting said holddown means and means mounting said jack permitting movement thereof whereby a shoe mounted on said jack and clamped in position by said holddown means may be translated relative to said pounding means, means for urging said pounding means into operative position relative to a heel mounted on said jack, and means for translating said jack, holddown means and a shoe clamped therebetween relative to said pounding means whereby the total heel seat area of the shoe is exposed to said pounding means.

27. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said jack, means for imparting a pounding stroke to said pounding means, and means for pivoting said jack, holddown means and a shoe clamped therebetween relative to said pounding means whereby the total heel seat area of the shoe is exposed to said pounding means.

28. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel of a shoe mounted on said jack, means mounting said holddown means and means mounting said jack permitting movement thereof whereby a shoe mounted on said jack and clamped in position by said holddown means may be translated relative to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

29. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel seat of the shoe mounted on said jack, means mounting said holddown means and means mounting said jack permitting movement thereof whereby a shoe mounted on said jack and clamped in position by said holddown means may be translated relative to said pounding means, locking means for restricting the movement of the jack and the holddown means during the operative cycle associated wtih heel attaching to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle wherein particular portions of the heel seat of a shoe mounted on the jack may be exposed to said pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

30. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and means operative by the pivotal movement of said jack to free said spindle and retain said mount, means for pounding the heel seat of a shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation, to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for pivoting said jack, holddown means and a shoe clamped therebetween relative to said pounding means in the automatic pounding cycle.

31. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and cam means operative by the pivotal movement of said jack to free said spindle and retain said mount, means for pounding the heel seat of the shoe mounted on said jack and means mounting said jack for pivotal movement relative to said pounding means whereby the total heel seat area of the shoe mounted on said jack is exposed to said pounding means.

32. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, cam means operative by the pivotal movement of said jack to free said spindle and retain said mount, and means for inserting attaching means into said heel and shoe, locking means for restricting movement of the jack during the cycle associated with the attaching operation to ensure alinement thereof relative to the holddown means and inserting means, means for releasing said locking means to permit the heel seat pounding operation, means for pounding the heel seat of the shoe mounted on said jack, means for urging said pounding means into operative position relative to a heel mounted on said jack, and means mounting said jack for movement relative to said pounding means whereby the total heel seat area of a shoe mounted on the jack may be exposed to said pounding means.

33. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and of cam means operative by the pivotal movement of said jack to free said spindle and retain said mount, means for pounding the heel seat of a shoe mounted on said jack, means mounting said holddown means and means mounting said jack permitting movement thereof whereby a shoe mounted on said jack and clamped in position by said holddown means may be translated relative to said pounding means, means for urging said pounding means into operative position relative to a heel mounted on said jack, and means for translating said jack, holddown means and a shoe clamped therebetween relative to said pounding means whereby the total heel seat area of the shoe is exposed to said pounding means.

34. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, cam means operative by the pivotal movement of said jack to free said spindle and retain said mount, and means for inserting attaching means into said heel and shoe, means for pounding the heel seat of the shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said jack, means for imparting a pounding stroke to said pounding means, and means for pivoting said jack, holddown means and a shoe clamped therebetween relative to said pounding means whereby the total heel seat area of the shoe is exposed to said pounding means.

35. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and cam means operative by the pivotal movement of said jack to free said spindle and retain said mount, means for pounding the heel of the shoe mounted on said jack, means mounting said holddown means and means mounting said jack permitting movement thereof whereby a shoe mounted on said jack and clamped in position by said holddown means may be translated relative to said pounding means, means permitting the selection of either a manual pounding cycle whereby particular portions of the heel seat of a shoe mounted on the jack may be exposed to the pounding means at the direction of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

36. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, and cam means operative by the pivotal movement of said jack to free said spindle and retain said mount, means for pounding the heel seat of the shoe mounted on said jack, means mounting said holddown means and means mounting said jack permitting movement thereof whereby a shoe mounted on said jack and clamped in position by said holddown means may be translated relative to said pounding means, locking means for restricting the movement of the jack and the holddown means during the operative cycle associated with heel attaching to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle wherein particular portions of the heel seat of a shoe mounted on the jack may be exposed to said pounding means at the discretion of the operator of the machine or of an automatic pounding cycle wherein the entire heel seat area of a shoe mounted on the jack is exposed to said pounding means, and means for translating said jack, holddown means and a shoe clamped therebetween relative to said pounding means in the automatic pounding cycle.

37. In a heel attaching and heel seat pounding machine comprising a jack pivotal between a work receiving position and an operative position, means located on said jack for mounting a last bearing a shoe, said mounting means comprising a mount and a spindle, means for retaining said spindle against movement and for permitting movement of said mount when the jack is in the work receiving position, cam means operative by the pivotal movement of said jack to free said spindle and retain said mount, and means for inserting attaching means into said heel and shoe, means for pounding the heel seat of a shoe mounted on said jack, means mounting said holddown means permitting pivotal movement thereof, means mounting said jack permitting pivotal movement thereof whereby a shoe mounted thereon and clamped in position by said holddown means may be pivoted relative to said pounding means, locking means for restricting movement of the jack and the holddown means during the operative cycle associated with the attaching operation to ensure alinement thereof relative to the inserting means, means for releasing said locking means to permit the heel seat pounding operation, means for urging said pounding means into operative position relative to a heel mounted on said jack, means for imparting a repetitive pounding stroke to said pounding means, means permitting the selection of either a manual pounding cycle whereby particular portions of the heel seat of a shoe mounted on the jack may be exposed to the pounding means at the discretion of the operator of the machine or of an automatic pounding cycle wherein the entire heel seat area of a shoe mounted on the jack is exposed to said pounding means, and means for pivoting said jack, holddown means and a shoe clamped therebetween relative to said pounding means in the automatic pounding cycle.

References Cited by the Examiner
UNITED STATES PATENTS

| | | | |
|---|---|---|---|
| 1,971,344 | 8/1934 | Hardy | 12—42 |
| 2,324,479 | 7/1943 | Brandt | 12—42 |
| 2,428,047 | 9/1947 | Standish | 12—126 |
| 2,764,768 | 10/1956 | Ashley et al. | 12—42 |

PATRICK D. LAWSON, *Primary Examiner.*

UNITED STATES PATENT OFFICE
CERTIFICATE OF CORRECTION

Patent No. 3,302,226                                  February 7, 1967

Chester E. Rogers, Jr.

It is certified that error appears in the above identified patent and that said Letters Patent are hereby corrected as shown below:

Column 14, line 74, and column 15, lines 37, 39, and 49, "pack", each occurrence, should read -- jack --. Column 15, line 36, cancel "said". Column 17, line 1, "mouning" should read -- mounting --. Column 19, line 58, after "said" insert -- pounding --. Column 20, line 22, "enging" should read -- engaging --. Column 25, line 9, "direction" should read -- discretion --.

Signed and sealed this 13th day of January 1970.

(SEAL)
Attest:

Edward M. Fletcher, Jr.                           WILLIAM E. SCHUYLER, JR.
Attesting Officer                                      Commissioner of Patents